US012298524B2

(12) United States Patent
Vuong et al.

(10) Patent No.: US 12,298,524 B2
(45) Date of Patent: May 13, 2025

(54) MULTI-LENS SYSTEM FOR IMAGING IN LOW LIGHT CONDITIONS AND METHOD

(71) Applicant: The Regents of the University of California, Oakland, CA (US)

(72) Inventors: Luat Vuong, Riverside, CA (US); Baurzhan Muminov, Riverside, CA (US); Ji Feng, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 887 days.

(21) Appl. No.: 17/314,895

(22) Filed: May 7, 2021

(65) Prior Publication Data

US 2021/0349324 A1 Nov. 11, 2021

Related U.S. Application Data

(60) Provisional application No. 62/704,412, filed on May 8, 2020.

(51) Int. Cl.
*G02B 27/42* (2006.01)
*G02B 3/00* (2006.01)
*G02B 27/09* (2006.01)
*G06N 3/04* (2023.01)
*B82Y 20/00* (2011.01)

(52) U.S. Cl.
CPC ....... *G02B 27/0905* (2013.01); *G02B 3/0006* (2013.01); *G02B 27/4205* (2013.01); *G06N 3/04* (2013.01); *B82Y 20/00* (2013.01)

(58) Field of Classification Search
CPC .. G02B 27/4205; G02B 27/0905; G06N 3/08; G06N 3/0045
See application file for complete search history.

(56) References Cited

U.S. PATENT DOCUMENTS

2018/0284025 A1* 10/2018 Gozali ............... G02B 21/0076
2020/0351454 A1* 11/2020 Wu ........................ H04N 23/11

OTHER PUBLICATIONS

Novak, K., "Compact vortex wavefront coding camera", Proc. SPIE 11396, Computational Imaging V, 113960O, (Apr. 12, 2020), 10 pgs.

* cited by examiner

*Primary Examiner* — Ryan D Howard
(74) *Attorney, Agent, or Firm* — SCHWEGMAN LUNDBERG & WOESSNER, P.A.

(57) ABSTRACT

Described herein are imaging devices and associated methods. Devices and methods are described that include a plurality of topological phase modulators. In one example, the plurality of topological phase modulators includes an array of spiral vortices. Devices and methods are described that include a neural network to reconstruct images using data from the plurality of topological phase modulators.

17 Claims, 20 Drawing Sheets

(a) Original (c) Vortex reconstructed (c) Fourier reconstructed

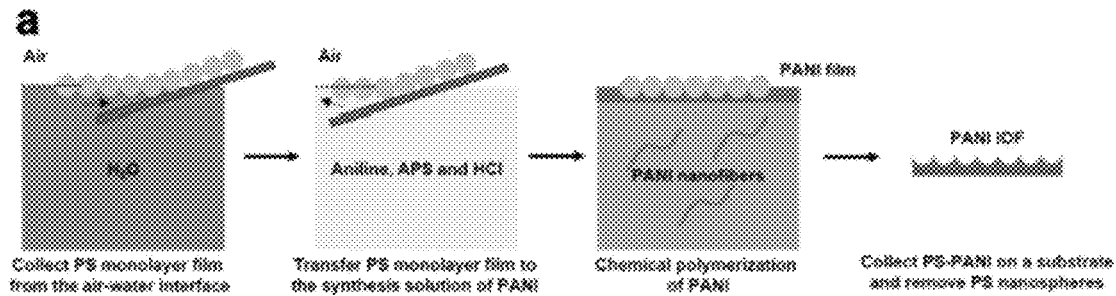
FIG. 10a
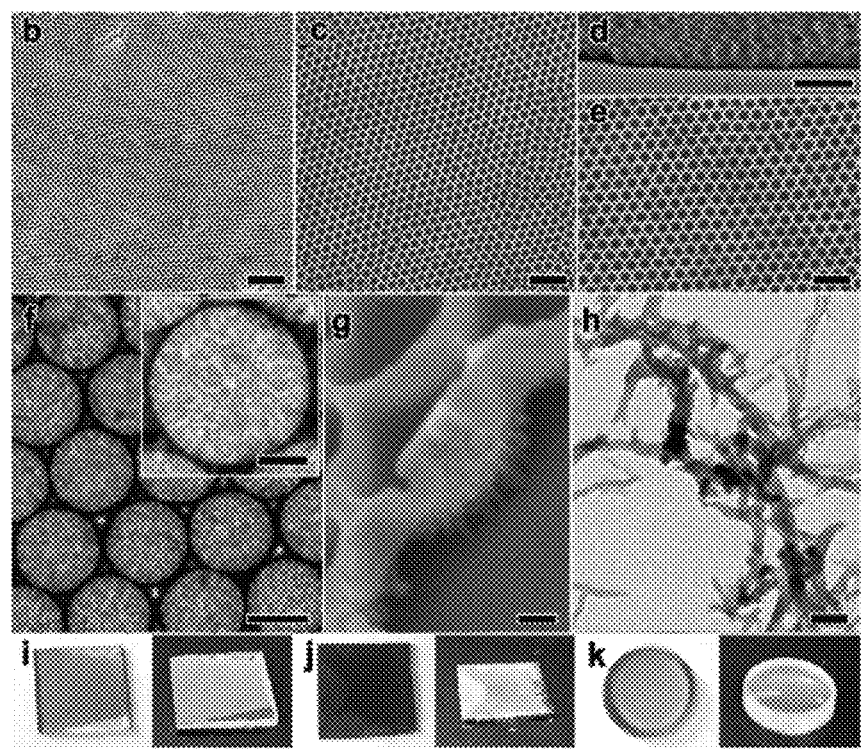
FIG. 10b-k d: size of the pore; r: size of the edge; R: radius of the template (PS nanosphere); t: thickness of the PANI shell; h: height of the pore.

d, t and R were measured from SEM images. r was calculated by r = R − d/2. h was calculated by h = R − (R² − (d/2)²)^{1/2}.

| Unit, nm | S1 | S2 | S3 |
|---|---|---|---|
| d | 220 | 465 | 670 |
| t | 80 | 80 | 80 |
| h | 68 | 138 | 228 |
| r | 15 | 22.5 | 25 |
| R | 125 | 265 | 360 |

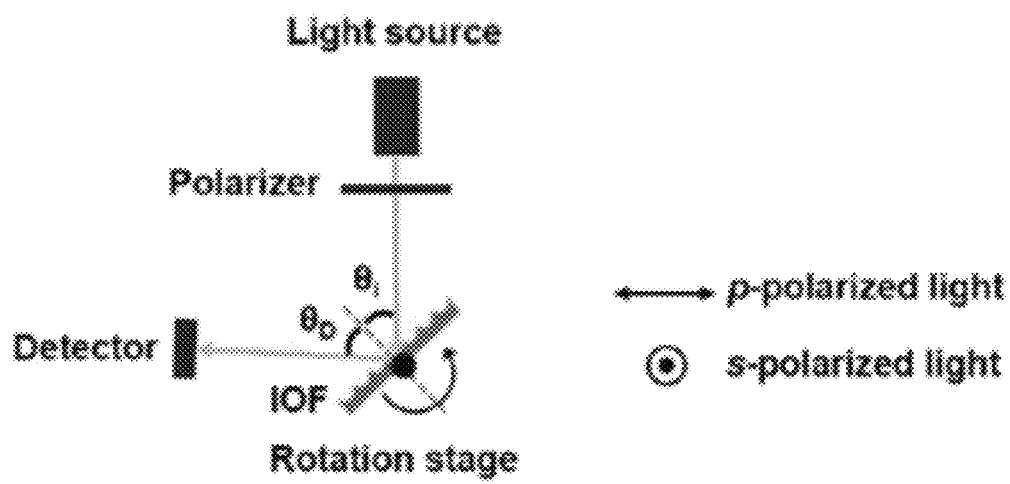
FIG. 13a
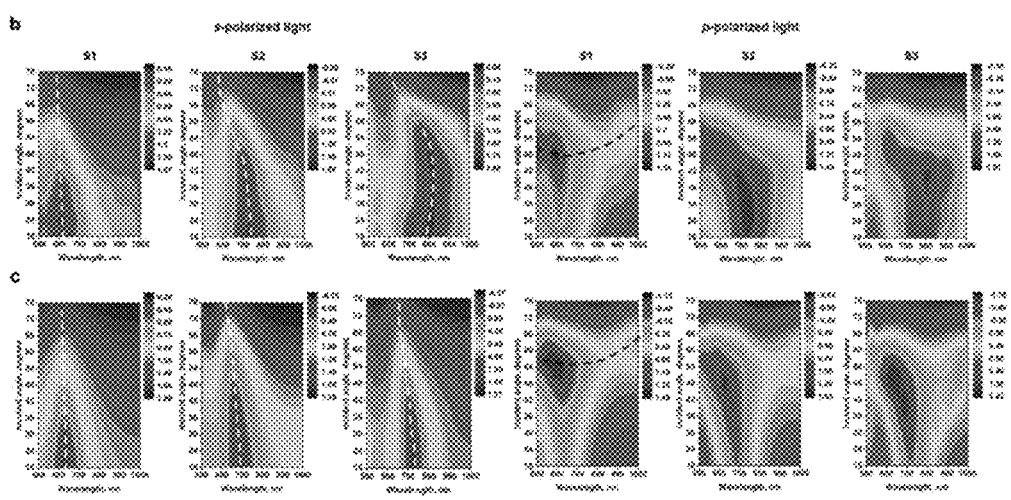
FIG. 13b-c

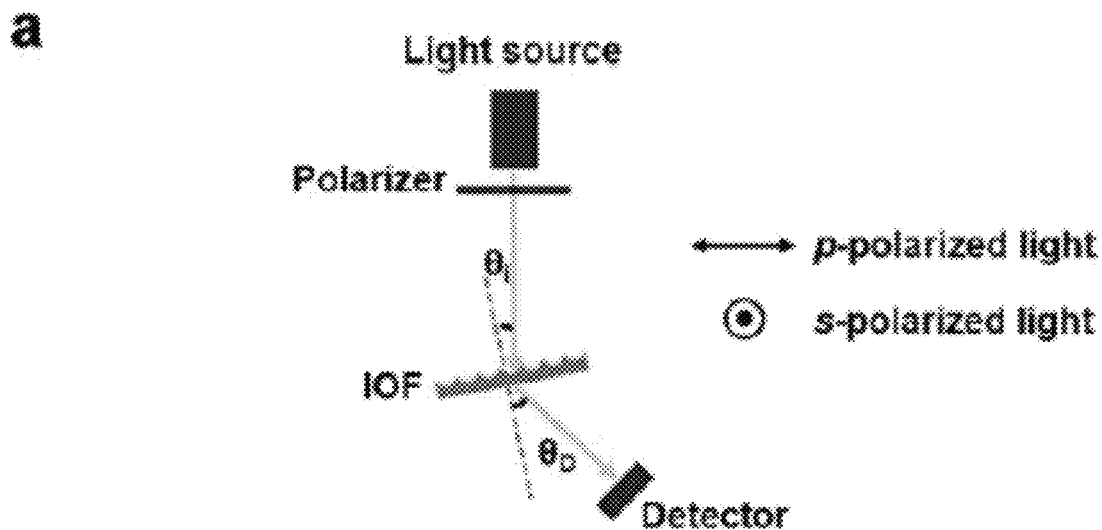
FIG. 14a
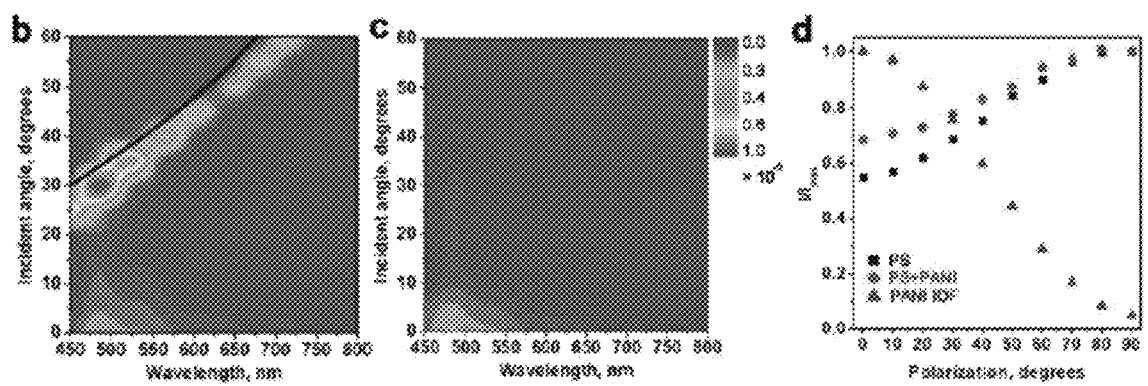
FIG. 14b-d e f

MULTI-LENS SYSTEM FOR IMAGING IN LOW LIGHT CONDITIONS AND METHOD

CLAIM OF PRIORITY

This application claims the benefit of priority under 35 U.S.C. § 119(e) to U.S. Patent Application Ser. No. 62/704,412, filed on May 8, 2020, which is incorporated by reference herein in its entirety.

STATEMENT OF GOVERNMENT INTEREST

This invention was made government support under Contract No. D19AP00036 awarded by the Defense Advanced Research Projects Agency (DARPA). The government has certain rights in the invention.

TECHNICAL FIELD

Embodiments described herein generally relate to imaging devices and methods.

BACKGROUND

Our ability to solve inverse problems and reconstruct object features from either incomplete or mixed-image signal components is essential for a broad range of applications, from x-ray imaging to remote sensing. Reconstruction of an object from sensor data in many problems is challenging from a practical standpoint, since algorithms must address the famous Phase Problem where the phase information is lost by the sensor that only registers the light magnitude or intensity. Iterative approaches have been developed but are time-consuming, since the process may require multiple restarts with several initial guesses until convergence is achieved. It is fascinating how this are—iterative solutions of the Phase Problem—developed and gave rise to a set of optimization techniques that are today applied in other domains and notably, provide the capacity to image through turbid and scattering media. However, it's also possible to obviate the Phase Problem for image construction with computational imaging. An expanding area in this field is the application of neural networks, specifically deep-learning convolutional neural networks (CNNs). CNNs and other algorithms with higher computational complexity are vulnerable to adversarial attacks and have other disadvantages. Improved imaging devices and methods are desired that reduce computational needs and improve resolution in low light conditions.

BRIEF DESCRIPTION OF THE DRAWINGS

FIGS. 10a-10k. (a) Schematic illustration of the synthesis. SEM images of PANI-IOFs with different pore sizes: (b) S1, top-view, (c) S2, top-view, (d) S3, cross-section, and (e) S3, top-view. High magnification TEM (f) and SEM (g) images of S3 showing the vertical alignment of nanofibers. (h) TEM image of PANI nanofibers formed in solution (h). Digital images of PANI-IOFs on (i) a 1 cm² glass slide, (j) a 1 cm² silicon wafer and (k) a convex lens (6 mm in diameter). The transmitted and reflected color was shown by placing the sample on a white and black substrate. The scale bars are 2 μm in (b-d), 500 nm in (f), and 200 nm in (g, h and the inset of f).

FIGS. 13a-13c. (a) Schematic illustration of the setup for optical dispersion characterizations. Angular resolved reflectivity spectra of the PANI-IOFs supported on a glass substrate: (b) experimental data, and (c) simulation data. The white and black dotted lines are guidance for the eyes and represent the modes and Brewster-angles, calculated from interpolated values of the complex refractive index. The intensity of the spectra (I) is normalized by the intensity of the incident light ($I_0$). The scale bars show the values of log $[(I/I_0)*100\%]$.

FIGS. 14a-14f. (a) Schematic illustration of the polarization-dependent transmissive spectral measurement. $\theta_i$ and $\theta_D$ represents the incident angle and detector angle. Transmissive spectra dispersion of S3 illuminated by (b) s- and (c) p-polarized light. $\theta_i$ changes from 0° to 60° with $\theta_D$ fixed at 15°. The spectra are normalized by the intensity of the incident light. The black line in (b) represents the position of diffraction peaks by simulation. (d) Change of diffraction intensity with the angle of polarization for a PS nanosphere opal, a PS nanosphere opal coated with PANI and a PANI IOF (S3). (e) Experimental setup for polarization-dependent imaging. A spatial light modulator modulates the polarization of light in a designed pattern. (f) Digital images of letters displayed by S3 on a 2.54*2.54 cm² glass slide imaged simply by modulating the polarization of light. The arrows in the "U" pattern and its background indicate the polarization direction of light form the spatial light modulator.

DESCRIPTION OF EMBODIMENTS

Figure 1:
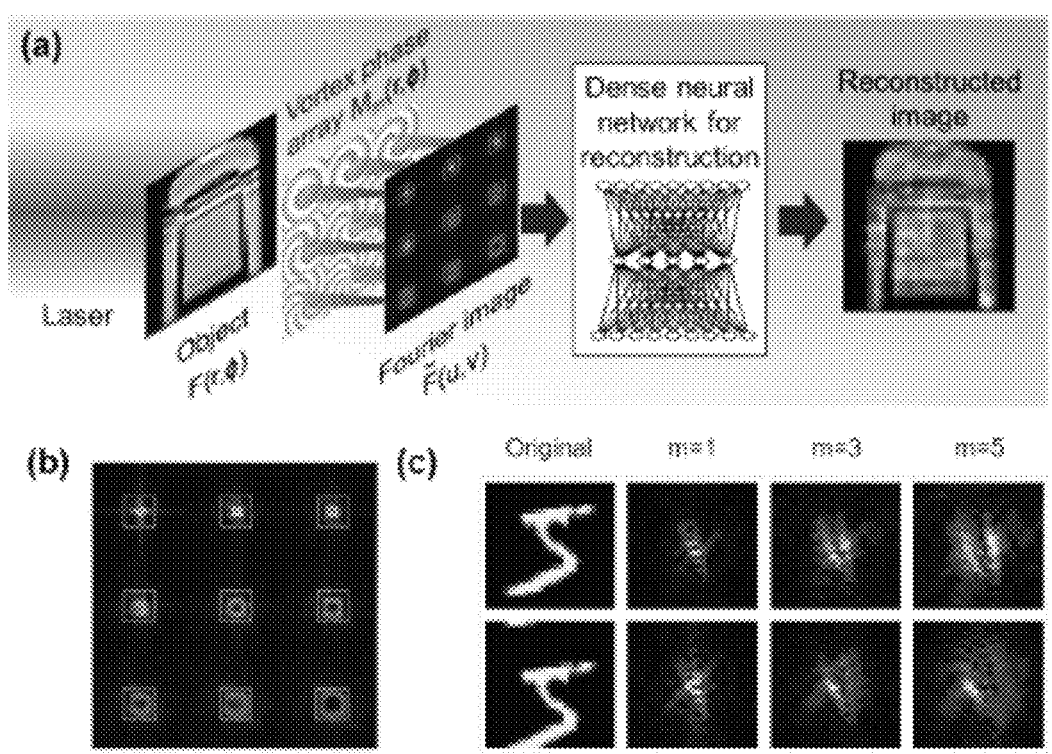
FIG. 1. (a) The general schematic of the technique: a coherent light source (e.g. laser) illuminates the object. Transmitted light is phase modulated with the multi-vortex lens array. Its Fourier image is collected in the sensor plane. The vortex Fourier intensity patterns are fed to a neural net that reconstructs the original image with real and imaginary parts. Vortex-Fourier patterns for a (b) centered and (c) shifted MNIST handwritten '5' showing that the intensity pattern of the vortex-Fourier representation is not translation invariant.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In the following description, a specific vortex example of a "topological phase" is used for illustration, however the invention is not so limited, and other topological phases may be used in addition to vortices. Other examples include, but are not limited to, off-axis singularities and edge dislocations in the phase. In addition, polarization may be manipulated topologically. For example, the birefringence or optical activity, changes in the refractive index for different polarizations, can vary spatially through the phase plate so that the polarization produces a vortex (azimuthal or radial) or some other spatially varying pattern.

In selected examples, the topological phases (whether from a point singularity-vortex or edge dislocations) lead to Fourier-plane interference patterns, where a simple neural network can deconvolve and reconstruct the original image.

Further, in the examples used below, a monochromatic laser light is used as an example, however, the invention is not so limited. Non-monochromatic light may be used in other examples.

We introduce a topological phase transform with a lenslet-array for high-speed and low-light imaging. Our approach exploits the compactness of the Fourier representations and edge detection from Fourier-transformed spiral-phase gradients. This hybrid optical-digital approach presents a favorable trade-off, effectively boosting the signal-to-noise ratio by lowering the pixel resolution of the reconstructed image. Once trained, a dense neural network reconstructs an object from intensity-only data and efficiently solves the inverse mapping problem without performing iterations with each image and without deep learning schemes. We show that with vortex spatial encoding, the neural network operates without learned stereotypes and with low computational complexity, low reconstruction latency, and robustness to noise. The approach indicates potential for real-time, low-power video processing in low-signal environments. MNIST images in a vortex Fourier representation are reconstructed at a rate of several thousand frames per second on a 15 W central processing unit, two orders of magnitude faster than convolutional neural net schemes. In addition, the dense neural network is trained at a rate 20-times faster with the vortex encoding compared to random encoding schemes.

1. Introduction

Our ability to solve inverse problems and reconstruct object features from either incomplete or mixed-image signal components is essential for a broad range of applications, from x-ray imaging to remote sensing. Reconstruction of an object from sensor data in many problems is challenging from a practical standpoint, since algorithms must address the famous Phase Problem where the phase information is lost by the sensor that only registers the light magnitude or intensity. Iterative approaches have been developed but are time-consuming, since the process may require multiple restarts with several initial guesses until convergence is achieved. It is fascinating how this are—iterative solutions of the Phase Problem—developed and gave rise to a set of optimization techniques that are today applied in other domains and notably, provide the capacity to image through turbid and scattering media.

However, it's also possible to obviate the Phase Problem for image construction with computational imaging. An expanding area in this field is the application of neural networks, specifically deep-learning convolutional neural networks (CNNs). With CNNs, the recording of an interference pattern such as a hologram, or several overlapping snapshots as with ptychography, can be used to reproduce object features. The first (to the authors' knowledge) application of CNNs for image reconstruction, is presented in, where a phase-encoded image on a spatial light modulator is reconstructed via CNNs using intensity data from the camera. "Non-line-of-sight" imaging is achieved with CNNs using albedo autocorrelation patterns obtained from the speckle image using a 300-mW continuous-wave laser or pulsed laser. In these examples as well as others that leverage neural networks, it is possible to reconstruct an object type without solving the Phase Problem. Notably, one may successfully predict an object using prior-trained patterns without being able to identify the position of the object.

Still, deep learning neural networks offers additional functionality in the process of reconstructing the object. For example, simultaneous autofocusing with phase recovery or super-resolution in pixel-limited or diffraction-limited systems. With sets of training and testing diffusers, the phase information encoded through controlled speckle patterns can be leveraged to predict the outputs from previously unseen diffusers. The non-exhaustive list of important applications includes profilometry, imaging through smoke, LIDAR that leverages multiple point cloud and time-of-flight information. Additional examples of "nonlinear reservoir learning" are presented in, which employs caustic patterns for original object reconstruction. The challenge with deep learning methods, however, is that the neural network requires large training sets and long training times. These neural networks have higher degrees of computational complexity that render them vulnerable to adversarial network attacks. Therefore, our research with small-brain machine learning asks whether it possible to achieve additional image-reconstruction functionality without deep-learning and without iterative schemes. Such "small brain" approaches are regression-based and provide the advantage of a single forward pass, i.e., no requisite iterative phase retrieval procedures.

In this paper, we demonstrate a new approach to reconstruction with optical preprocessing in lieu of CNNs. Our approach is similar to other hybrid and diffractive optical neural network approaches that aim to offload mathematical computation to the propagation of light. What our scheme shows, unlike others is that a small-brain is capable of solving the inverse mapping with vortex spatial encoding. Moreover, the inverse mapping may be performed faster and with less computational complexity than with random encoded patterns. This indicates that the optical vortex performs feature extraction in the Fourier representation, which further reduces computational load.

Since Fourier representations are compressed (i.e., the area of the camera sensor is much smaller than the area taken in real domain image) and robust (the resulting computer vision scheme is not susceptible to the rapid variations in scene illumination), our imaging approach also provides capacity to successful operate under extremely low-light signal conditions when a real image cannot be captured. Instead of deep-learning algorithms, we use a dense neural network—which we refer to as a regression-based "small-brain".

Object reconstruction with Fourier representations have been shown reduce memory, power, or energy requirements, and may even achieve real-time image processing with CNNs. However, in each in the aforementioned cases using deep learning, the transferability of learned maps remains an issue—i.e., the trained neural nets are task-specific and, moreover, equipment-specific. This issue of transferability is further addressed in our work. We demonstrate that our small-brain approach is able to rapidly solve the inverse solution without specificity in the trained data.

Our approach exploits topological representations with optical vortices-more specifically, with Laguerre-Gaussian beams. Such beams with spiral phase gradients are characterized by a topological charge and associated phase singularities at which the electric field is strictly zero. A famous example that leverages the phase singularity for imaging is the "vortex coronograph," where a vortex phase is placed in the Fourier imaging plane. A higher-resolution vortex camera is recently demonstrated in where the reconstruction contrast ratio is increased as a result of the vortex phase.

In our approach, we achieve non-iterative, single-shot object reconstruction. A topological vortex-based lenslet-array design contains multiple vortex phases in a lenslet pattern, which yields orthogonal, edge-enhanced representations in the Fourier plane. The presence of the vortex provides spatial encoding to break the translation invariance of the measured Fourier pattern, which is part of the Phase Problem. Image reconstruction is performed with dense neural nets or shallow neural nets. Again, we refer to this few-hidden-layer approach that does not require deep learning as a "small-brain". Experimentally, our approach is robust to noise. In addition to quick reconstruction, we also show quick training of the neural network. The speed is achieved because vortices provide feature extraction to train the neural network quickly, 20 times faster than a random encoding scheme.

2. Innovation

FIG. 1 depicts our imaging scheme, where multiple images of the object $F(r, \Phi)$ are collected in the Fourier domain; the light transmitted through each lenslet is modulated by different vortex and lens mask patterns $M_m(r,\Phi)$. The camera detects the scaled, modulus-squared image of the Fresnel propagated, vortex-Fourier-transformed electric field, $$|\tilde{F}_m(u,v)|^2 = |\mathcal{F}\{F(r,\phi)M_m(r,\phi)\}|^2 \quad (1)$$

where m is the vortex topological charge, r and $\Phi$ are the real domain cylindrical coordinates, u and v are the Fourier-plane Cartesian coordinates, and F is the Fourier transform operator. The vortex Fourier intensity patterns $\tilde{F}$ are concentrated in a relatively small area but is typically donut-shaped, with a wider donut as m increases 1(b). The role of vortex phase in the 'real-domain' is to spatially encode and break translational invariance of the Fourier-transformed intensity pattern 1(c). We consider a few small-image datasets as object inputs and compare different representations in $F(r, \Phi)$. For each positive, real-valued image Y, we map the phase changes:

$$F(r,\phi) = e^{i\alpha_0 Y} \quad (2)$$

where $\alpha_0$ is the dynamic range of the object phase-shift. This mapping is convenient because the signal power is invariant with our choice of Y. We have also considered opaque objects where Y blocks or absorbs the signal, i.e., $F(u, v) \propto Y$, which yields similar trends.

There are three primary innovations in our results. We demonstrate: 1) edge enhancement of spectral features with a vortex lens in such a manner that allows us to reconstruct the phase of the Fourier image; 2) rapid inverse reconstruction of the image without a similar, learned dataset; and 3) robustness to noise, which depends on the layer activations.

A. The Vortex Fourier Transform and Vortex Feature Extraction

Our focus is the particular lenslet pattern composed of multiple-m vortex phases, each with a pattern:

$$M_m(r, \phi) = e^{\frac{-i\pi r^2}{\lambda f} + im\phi} \quad (3)$$

where $\lambda$ is the wavelength and f is an effective focal length. This pattern may be generalized and does not require for m to be an integer.

An essential aspect of the vortex phase is related to the edge-detection property of Laguerre-Gaussian beams with Fourier transforms. In our work, we demonstrate image feature extraction with vortex Fourier-space operators. A heuristic explanation follows. At the phase plate, we consider the field to be a sum of Laguerre-Gaussian modes at z=0 with different radial indices p, $$M_m(r, \phi) = \sum_p W_p LG_{m,p}(r, \phi) \quad (4)$$

where the weighted coefficients $$W_p = \int_0^a 2\pi r^{m+1} L_p^{|m|}(r^2/w_m^2) dr. \quad (5)$$

Equation 4 is a modal decomposition at the phase mask over the aperture of radius a and where $L_p^{|m|}$ are the generalized Laguerre polynomials, and $w_m$ is the waist of the beam, which we assume is significantly larger than the features of object F. We separate modal components, $$LG_{m,p}(r, \phi) = L_p^{|m|}(r^2/w_m^2) R(r) V_m(r, \phi) G_m(r, \phi) \quad (6)$$

$$R(r) = e^{\frac{-i\pi r^2}{\lambda f}} \quad (7)$$

$$G_m(r, \phi) = A_m e^{-\left(\frac{r}{w_m}\right)^2} \quad (8)$$

$$V_m(r, \phi) = r^m e^{im\phi} \quad (9)$$

where $$A_m = \frac{\sqrt{2p!/(\pi(|m|+p)!)}}{w_m^{m+1}}$$

are the unit-power normalizing coefficients, which depend on m. The combination of radial magnitude and azimuthal phase $V_m$ yields an interesting operator in the Fourier domain, $$V_m(r,\phi) = r^m e^{im\phi} = (r\cos(\phi) + i\,r\sin(\phi))^m, \quad (10)$$

since $r\cos(\Phi)$ and $r\sin(\Phi)$ are the canonical x and y variables in Cartesian coordinates, the Fourier transform of $V_m$ is $$\overline{V} = (u, v) = \mathcal{F}\{V_m(r, \phi)\} = \left(\frac{\partial}{\partial u} + i\frac{\partial}{\partial u}\right)^m, \quad (11)$$

while the radial quadratic phase R(r) yields a scaling factor in the Fourier-plane image. With Eq. 11, the detected camera image is:

$$\left|\tilde{F}_m\left(\frac{uf}{\pi\lambda}, \frac{vf}{\pi\lambda}\right)\right|^2 = \left|\sum_p W_p \left(\frac{\partial}{\partial u} + i\frac{\partial}{\partial u}\right)^m \mathcal{F}\{F(r, \phi)G_m(r, \phi)\}\right|^2. \quad (12)$$

Notably, the detected intensity patterns [Eq. 12] are composed of differentials of the Fourier-transformed components of the Gaussian aperture object F, mixed with various weights $W_p$. This differential scheme provides feature extraction of the Fourier transform and also mixes the real and imaginary parts in a manner that can be reconstructed as long as different m are used. A differential scheme for image reconstruction is deployed in the HER- ALDO method; however, this older technique employs iterative algorithms instead of dense neural networks. Without loss of information from the finite aperture a or focal length f, only 2 vortex-modulated images are needed to achieve optimal inverse mapping.

B. Small-Brain Machine Learning of the Inverse Reconstruction Mapping without Stereotypes Our efforts with the reconstruction of classification datasets are aimed at "unboxing the black box" of the machine-learned image reconstruction, since a neural network is capable of guessing the reconstruction based on pre-learned patterns without solving the inverse or Phase Problem. When solving the inverse problem directly, our algorithm is transferable or generalizable, and the imaging scheme is capable of being applied as a "camera". We test the vortex-Fourier spatial encoding scheme with several categorically-patterned datasets, namely the classical Fashion-MNIST, Kuzushiji-MNIST Arabic, as well as the handwritten MNIST digit dataset. The "ground truth" outputs Y are the dataset's 28×28-pixel images and are unit-normalized to provide comparable peak signal to noise (PSNR) with different image types across datasets.

The inputs X are the modulus-squared vortex Fourier-transforms of Gaussian-apertured Y. We set $\alpha_0=\pi/2$ in a phase modulation scheme [FIG. 2]. This is calculated with the Fourier transform of the element-multiplied output with the vortex phase matrix $M_m$ where we set/$\lambda$=2. If there is more than one vortex, the procedure is repeated and the vortex images are catenated or truncated for the neural network input X. A dense neural net with 2 hidden layers is trained with mean-squared error (MSE) loss function. During "training", the neural network is provided a subset of the related inputs X and Y, and during "testing", the neural network is provided with X as asked to solve for Y, which is the "validation" set, which are images that the neural net has never seen before.

Figure 2:
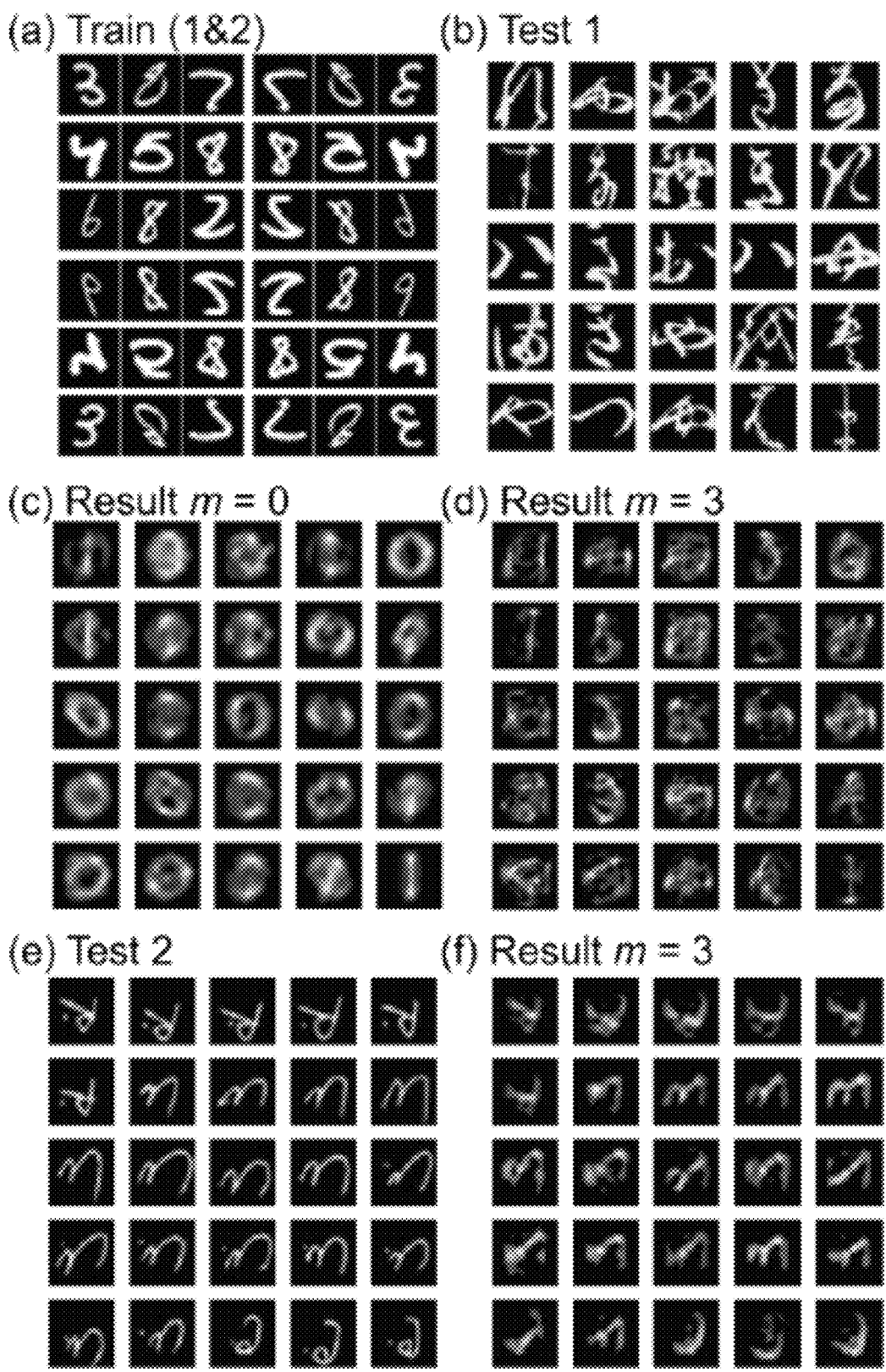
FIG. 2. (a) Training set: MNIST handwritten numbers, 4000. (b) Test set: MNIST Kanji. Reconstructed images with topological charges (c) m=0 and (d) m=3. When a (e) test set of Arabic letters is used with the same number training set and (f) reconstructed images. The model has not "seen" the Kanji or Arabic letters, as it was trained on combined MNIST dataset—the combination of original numbers and their flipped and rotated copies.
Figure 3:
FIG. 3. The (a) 25 of the original Fashion-MNIST dataset images. Reconstruction with (b) two vortices of topological charges $m_1=1$, $m_2=3$ using non-linear activation and (c) with m=0, with no vortex patterns. Without spatial encoding, the neural network still learns the patterns when there are categorical variations between training and test sets. With vortex spatial encoding, the reconstruction has superior resolution, with minimal ghosting or shadows, quantified further in Table 1.
Figure 3:
Figure 3:
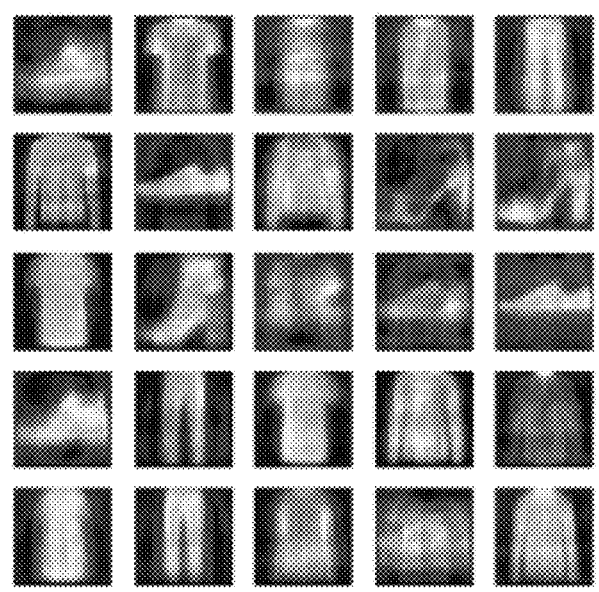

The importance of spatial encoding reconstruction is shown in FIG. 2. We train the simulations with numbers from the MNIST hand-written number dataset (flipped and inverted) [FIG. 2(a)]. However, we test with a separate dataset with patterns that are different. With Kuzushiji [FIG. 2(b)], the reconstruction fails when m=0 or when there is no spatial encoding [FIG. 2(c)] but the reconstruction succeeds, with loss of resolution, when m≠0, which we illustrate with m=3 in FIG. 2(d). Without spatial encoding and without previous patterns for guessing, the neural network does not have enough information to inverse-map F to F. With the Arabic data set, 2(e-f), the reconstructed letters are impressive since we limited our training to 40 types of handwritten marks that deviate substantially from the formal Arabic letters. This illustration is one approach to testing our intuition about the Phase Problem with neural networks.

Figure 4:
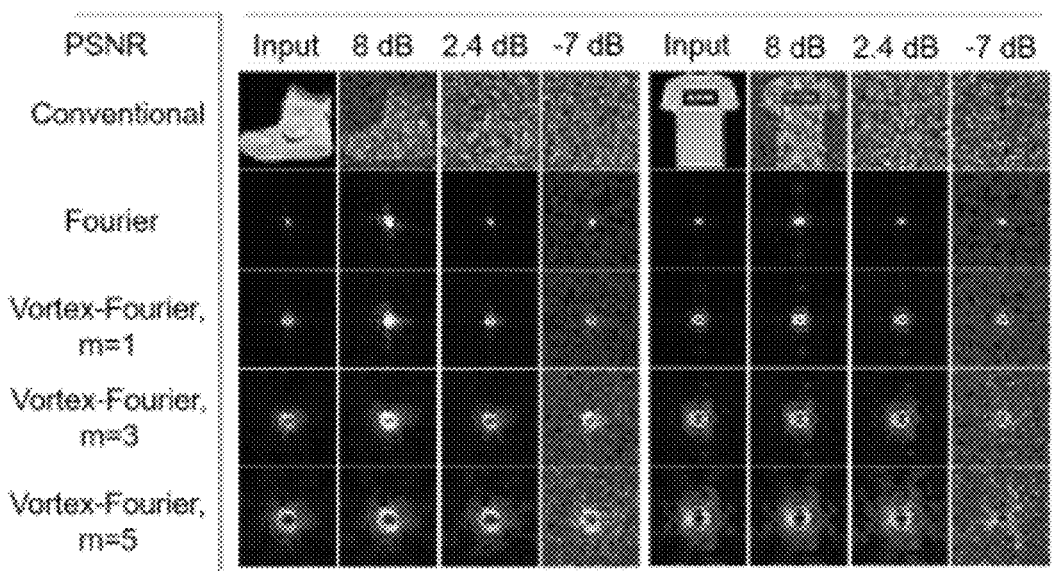
FIG. 4. Test inputs X to the neural network with noise for two Fashion-MNIST images. Each block shows decreasing peak signal to noise ratio (PSNR) in columns from left to right. The first row is the noise imprinted into the real image Y, which illustrates the PSNR. Subsequent rows show the convention Fourier transform, and vortex-Fourier representations of m=1, 2, and 4. The Fourier transform representations have higher PSNR that decreases with higher m given the same camera and light flux for Y.

We repeat the machine-learning problem where the training and testing sets are more similar, where the neural network is able to provide the inverse mapping of the F to F without spatial encoding. FIG. 4(a) shows the validation set. Even though the neural network has not seen the validation set before, unlike in the previous example, it has been trained with similar set of images that fall into various categories (shirt, shoes, dress, etc.). FIG. 4 shows discernible reconstructions of Fashion MNIST images when trained with the same dataset when m=0. In this case, the machine-learning neural network has learned patterns, and the reconstructed images exhibit ghosting from making those assumptions [FIG. 4(b)]. Again, it is important to emphasize that even though the neural network is able to reconstruct the MNIST images, it does so with learned similarities with the training set, which is not an inverse mapping.

With a vortex pattern, the Fourier-image phase is preserved and encoded, and the reconstructed images are impressively sharp and delineated. We note the absence of any kind of "ghost" images. This is an important remark as the faded silhouettes are problematic for classification and computer vision algorithms. Table 1 illustrates the convergence of the reconstructed images of the Fashion MNIST dataset to the original, both in terms of SSIM and MSE, as the number of vortices increases. We also employ the SSIM—Structural Similarity Index Metrics, which is a more reasonable metric for human quality perception evaluation, that is limited to [0,1] segment. For comparison, Table 1 also shows the SSIM and MSE for three-layer CNN-trained reconstruction with single and dual vortex datasets. This comparison suggests that our proposed architecture achieves the same quality, while yielding much lower computational overhead (more than 3000 FPS for the proposed network and less than 50 FPS for a three-layer CNN with 3×3 kernel).

TABLE 1

SSIM and MSE for Fashion-MNIST reconstruction. The table shows that acceptable quality is achieved with 2 vortices.

|  | Plain Fourier | 1 vortex, linear | 2 vortices, linear | 3 vortices | CNN, 1 vortex | CNN, 2 vortices |
| --- | --- | --- | --- | --- | --- | --- |
| SSIM | 0.45 | 0.62 | 0.84 | 0.88 | 0.61 | 0.84 |
| MSE | 0.0280 | 0.0242 | 0.0140 | 0.0122 | 0.0235 | 0.0145 |

C. Speed and Robustness to Noise

Our approach, using dense neural networks and MNIST datasets, not only aims at unboxing the black box of machine learning by solving the generalized problem of inverse construction, but also at accurate, rapid reconstruction in the presence of noise. We compare speed and robustness related to spatial vortex encoding with other random encoding approaches with respect to the two sources of noise: photon noise and dark noise, both having the Poisson distribution. For consistency we use peak SNR (PSNR), which we define according to equation:

$$PSNR = 10\log_{10}\left(\frac{L^2}{MSE}\right), \quad (13)$$

where L is dynamic range of the camera (e.g. 8 bits or 12 bits), MSE is defined as $$MSE(x, y) = \frac{1}{N}\sum(x_i - y_i)^2, \quad (14)$$

where N is the number of pixels and $x_i$ is the noiseless and $y_i$ is the noisy pixel value. We consider both sensor shot noise and dark noise to be generated with a Poisson distribution.

Figure 5:
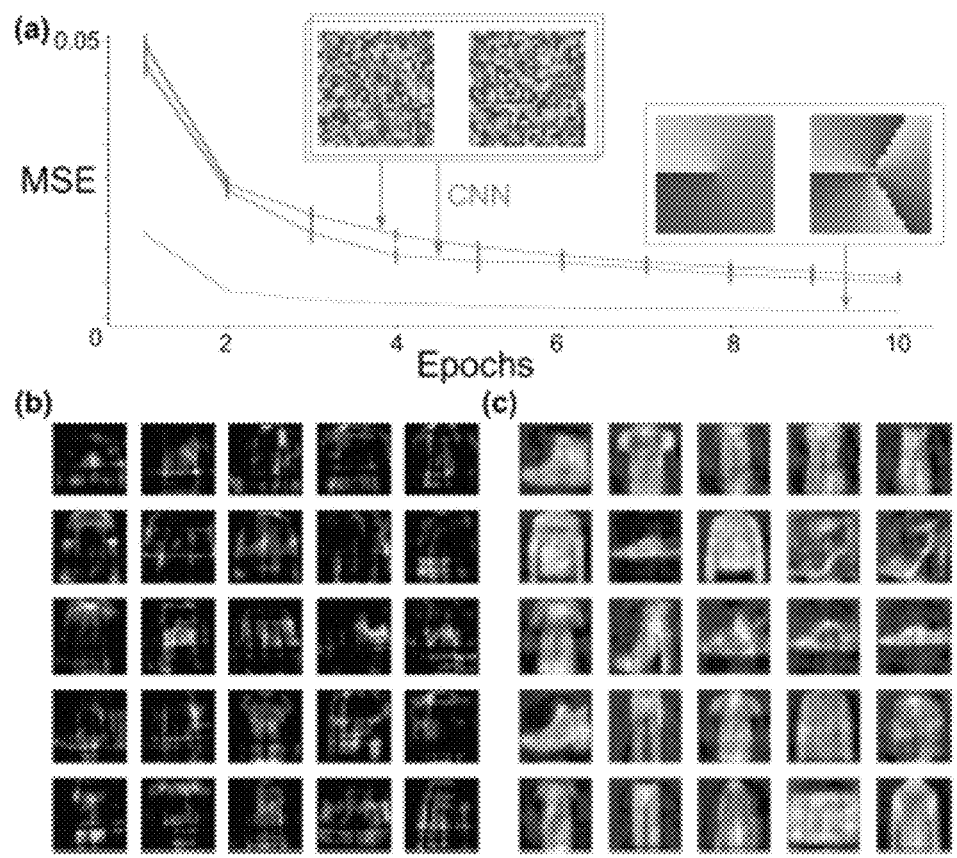
FIG. 5. (a) Convergence rate for the reconstruction of MNIST fashion images using either 2 vortices (m=1, 3) or 2 random patterns for the spatial encoder. The rate of convergence for the random encoder is similar to that with a convolutional neural network (CNN). With the addition of 2 dB noise, the (b) The reconstruction of validation set with two random patterns and (c) reconstruction of the same set using the dual vortex scheme.

FIG. 4 illustrates the tradeoff between resolution and robustness to noise. With higher-m (as well as lower f/λ), the Fourier-plane pattern covers a larger area, so that spectral features are sampled with better resolution limited by the aperture function and mask resolution [Eq. B]. The effective PSNR decreases as we increase m or reduce the focusing. With m=0 when there is no topological feature, the neural network cannot solve the Phase Problem. Both with and without noise, we compare our results to a random spatial encoding pattern, where vortices are replaced with a diffuser. As with other spatial encoding schemes, the SSIM or accuracy from reconstruction using the random phase patterns approaches the level of performance of vortex schemes in the no-noise scene. However, the training time required for the model to achieve "near vortex" performance increases for 3 to 8-10 epochs (without noise), and the reconstruction throughput is still the same. Furthermore, the situation changes drastically as we enter the noisy regime: while the vortex-Fourier encoding still preserves some actual information even in the case of high noise, the time to reconstruction increases considerably while the random patterns scheme fails completely. FIG. 5 shows this change with −2 dB noise. Thus, vortices provide feature extraction for efficient reconstruction of the object F̃ to F, as well as robustness to noise.

Figure 6:
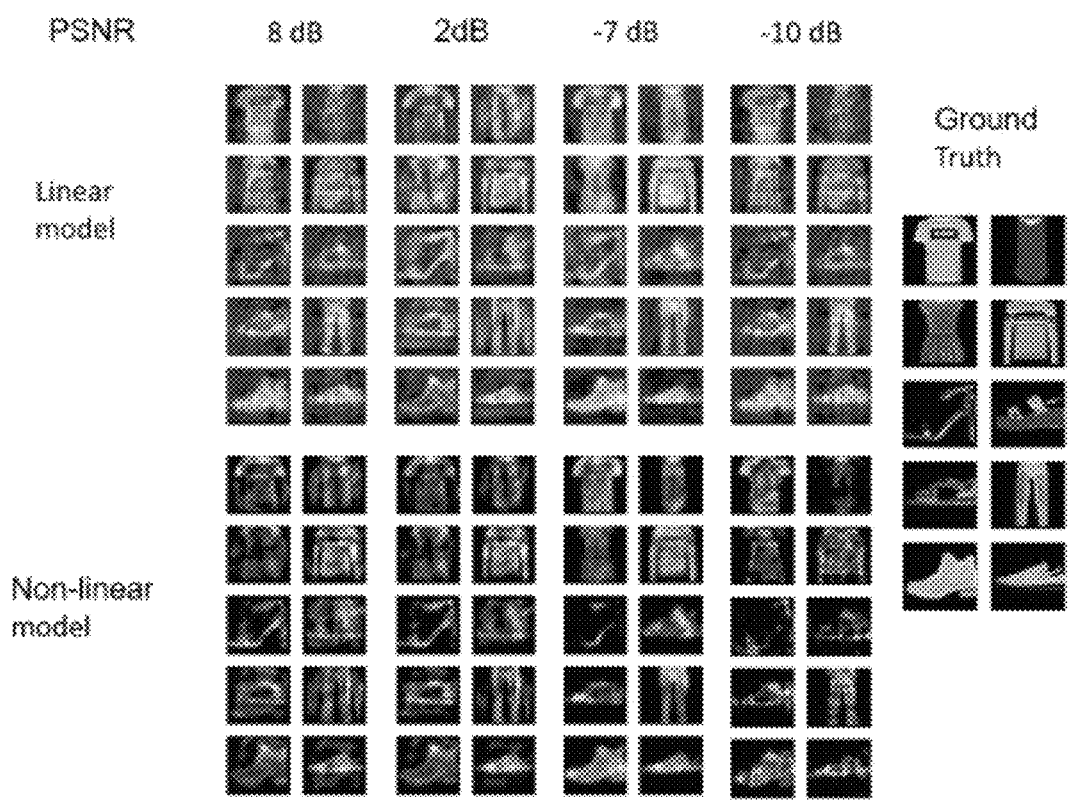
FIG. 6. The 2-vortex m=1, 3 for reconstruction under noisy conditions shows the effect of 'linear' and 'nonlinear' activations for the final layer. The linear activation produces a shallow and dense neural network that is more generalizable and transferrable with high noise. In contrast, with nonlinear activation, the shallow and dense neural network, while more accurate with low noise, performs less of the "inverse" mapping, as seen by a bias in reconstruction for highlighting edges.

An interesting aspect of the inverse problem arises in the presence of noise when the neural network is trained with images containing noise and also tested with images from the same dataset. The neural network also learns an inverse mapping; however, different layer activations are vulnerable to different types of noise. This is illustrated in FIG. 6. A linear model is associated with more ghosting and amplification of shot/dark noise, whereas a nonlinear model is more vulnerable to the Poissonian dark noise. The linear activation is more robust and produces better images in the presence of more noise. With high noise the nonlinear model's image quality is mixed. We find that the best model uses linear activations in the two hidden layers and nonlinear activations only for the last layer. The accuracy of the reconstruction saturates with two vortex features with centered, single-body objects.

A comparison of different random patterns suggests that the use of completely stochastic patterns are not best suited for image reconstruction, especially for practical applications. The structured base sets, such as topological phase vortices, are more effective for this task. Here, the vortex Fourier transform relies on coherent illumination.

Since the MNIST datasets are generally studied for type classification, we mention that we have also studied the categorical classification problem. With vortex Fourier transformed images, the most notable improvements are with speed and classification accuracy in the presence of added noise in the X inputs with testing. Without noise, the small brain is as accurate as that achieved with CNNs, however the small brain learns faster. With classification problems and the MNIST dataset, the advantage of speed with Fourier representations is known. The advantage of using a vortex spatial encoder here is robustness to noise.

The reason that small-brain dense neural networks are more robust to noise is because they are less computationally complex. We illustrate this classification robustness with vortex spatial encoding using the MNIST handwritten digit dataset [FIG. 7]. As before, the inputs X are the vortex-Fourier transformed digits, while outputs for classification are the numbers 0-9. No hidden layers are needed for the classification in order to achieve a similar level of accuracy achieved with CNNs.

Figure 7:
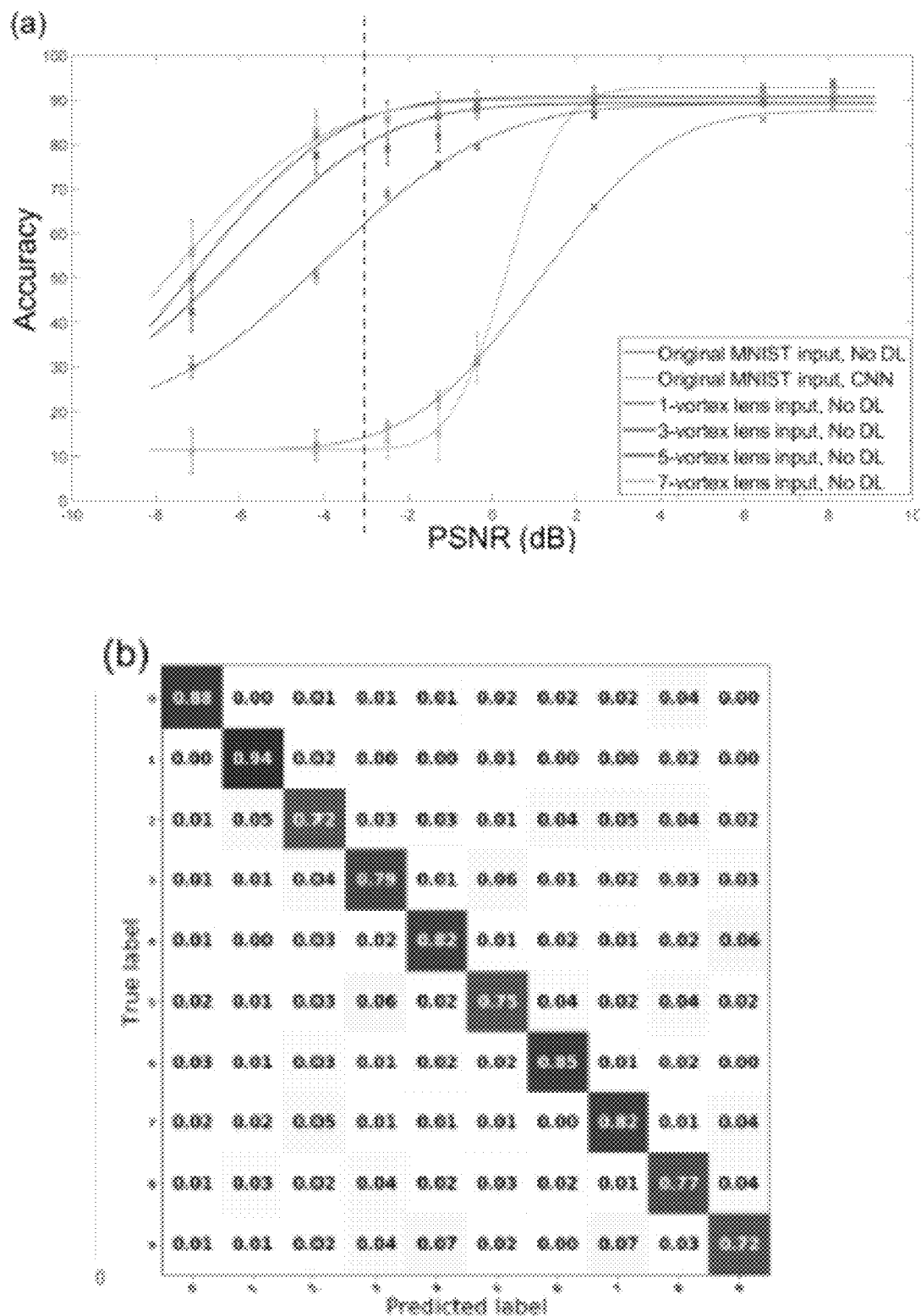
FIG. 7. (a) Categorical Classification accuracy of the MNIST handwritten dataset as a function of PSNR for 1, 3, 5, 7 multi-vortex arrays without deep learning (DL) or with dense neural networks. When the original MNIST data is input, the categorical accuracy is higher with a convolutional neural network (CNN) when the PSNR is greater than 3. A black dotted line denotes PSNR of −3 dB where (b) we plot the corresponding confusion plot.

A confusion plot for a single vortex (m=3) and SNR of −3 dB PSNR is shown in FIG. 7. Different numbers (shapes) have varying levels of classification output robustness to noise, which is related to our choice of m. In other words, certain digit geometries are more clearly mapped by certain m. Transmutation is a process of vortex charge migration, determined by combination of the object group symmetry and m. We expect that vortex transmutation govern not only governs the breakup of the vortex patterns in the Fourier transformation or propagation [Eq. 12], but also that the neural network also gains information from transmutation for classification.

3. Experiment

In experiments, we capture the Fourier intensity patterns when the illumination flux is too low for the object to be imaged directly by the camera. In this way, the vortex imaging and deconvolution approach performs as a low-light-level camera, suitable for night vision applications or imaging through noisy environments.

Figure 8:
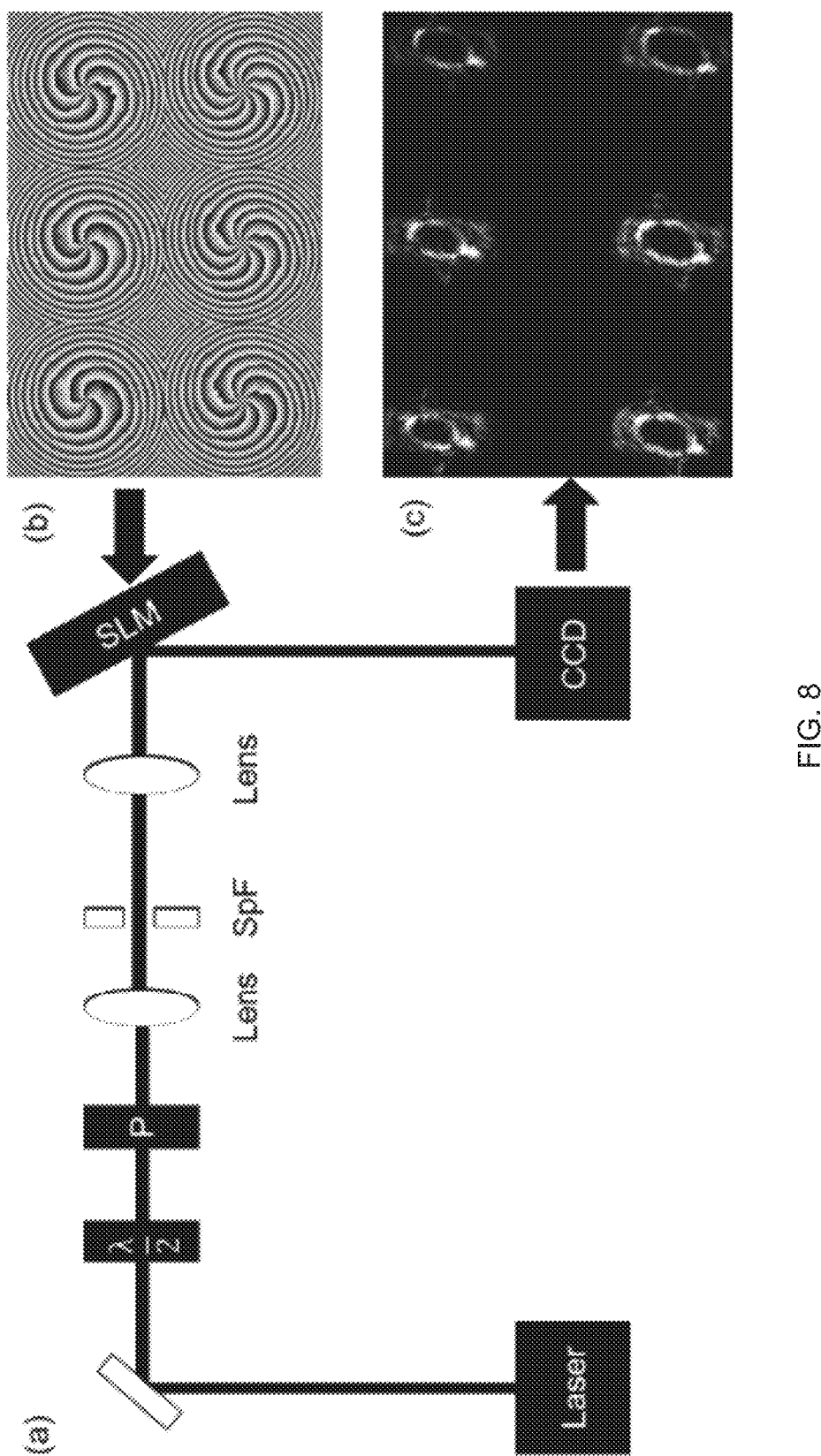
FIG. 8. (a) Experimental setup. A laser (lambda=532 nm) is directed on to the half-wave plate (λ/2), polarizer (P), and spatial filter (SpF) to obtain a near-perfect Gaussian beam. The lens focuses the beam on the spatial light modulator liquid crystal matrix (SLM) that operates in reflective mode. (b) The SLM imprints vortex and quadratic radial phase onto an MNIST handwritten digit from the PC. The reflected light is collected on the CCD camera and stored on the same PC. (c) Example CCD image.

The experimental setup is shown in FIG. 8(a). Coherent polarized light from the laser source is reflected off the two mirrors, passes through the half-wave plate to rotate its polarization plane. Polarizer ensures maximum of polarization degree and spatial filter eliminates parasite modes providing the near-perfect $TEM_{0,0}$ beam, the resulting beam is focused on the spatial light modulator (SLM) via the lens. The array of 6 images is modulated with vortices of different topological charges (m=4-9) and then sent to the SLM. The SLM, LCOS-SLM Hamamatsu, has 800*600 pixel resolution. We use lensless focusing by adding the Gaussian phase to the image. Lensless focusing, where the quadratic phase is on the spatial light modulator, is used to mimic the data collection with lenslet-array. The laser used in the experimental setup is Nd:YAG Fianium at its second harmonic), λ=532 nm. The laser power is tuned with the computer-controlled rotation of crossed polarizers and laser repetition rate.

Figure 9:
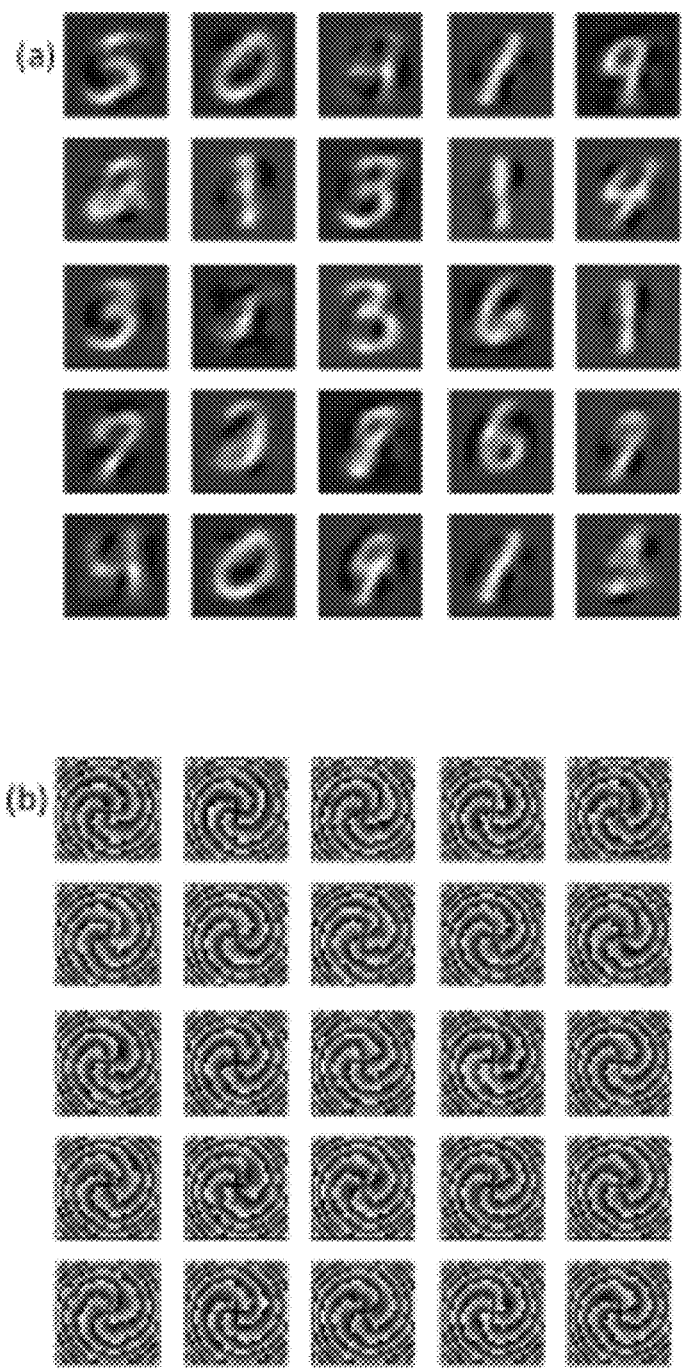
FIG. 9. (a) The result for experimental MNIST dataset reconstruction with two vortices (m=4 and m=9) under pulse laser power of <50 μW and exposure time of Δt=2.81 ms and (b) the vortex patterns for m=4 for the same numbers.

The reflected light is collected by the CCD camera—⅔ inch size, pixel dimensions of 4.65 μm×4.65 μm, 8 bit dynamic range and 0.7 MP (1024*768 pixels) resolution. The data is acquired in batches of 5000 images via automatic procedure using the Matlab software package. For analysis and to achieve similar results to the simulated efforts, CCD images are cropped to 28×28 pixel size for each of the vortices. The vortex phase imprinted by the vortex represents reflection by an MNIST dataset [FIG. 8(b)]. An example of the vortex patterns imaged by the camera are shown in FIG. 8(c). Example reconstruction using 2 of the experimentally measured vortex-Fourier image is shown in FIG. 9. Here, required light intensity level is low, less than 50 μW with an exposure time of 2.8 ms. In principle our approach is only limited to the sensitivity of the camera. Even though we are capable of placing 6 vortices on our SLM and imaging the result at once, the reconstruction achieves good results with only two vortex patterns and starts to saturate at three vortex patterns.

We presented a vortex-modulation approach to pre-processing data prior to a neural network. While many inverse problems are solved iteratively or involve CNNs, we show that it is possible to solve inverse problems with image differentials and obviate the need for CNNs with vortex- Fourier inputs. Spatial encoding with a topological phase results in efficient feature extraction for Fourier imaging and enables rapid inverse reconstruction of the object. The specific spatial encoding by a vortex provides mixed edge-enhanced real and imaginary components, so that with 2-3 vortices, the neural network is transferrable and may solve the inverse problem more generally. We observe that dense, small-brain, neural network with linear activations, the system behaves as a camera and is robust with low-light-levels or with noise. The small-brain machine-learning algorithm reduces the computational overhead with training and also reduces computational complexity, resulting in images being less vulnerable to adversarial attacks.

To summarize, the optical preprocessing with a topological phase mask in the Fourier domain is an imaging approach that is:

Robust to noise: Signals effectively achieve 200-2000× higher signal to noise ratios.

Single shot: Reconstruction is possible with a single image containing two vortices or two orthogonal topological phases Low-latency and fast: Our approach has potential for real time processing and video-camera streaming. We process several thousand frames per second with low-power hardware (10-20 W).

Computationally efficient: while other methods currently take multiple images or use iterative schemes, we know that only 2 vortices are needed to achieve near to ideal reconstruction.

Extremely low power: the technique uses explicitly simple neural nets (no deep learning) where preprocessing is completed with parallel optical propagation.

Memory compact: for memory; the vortex Fourier transform provides a compressed representation that minimizes the number of pixels that carry data forward.

Flexible with a digital re-adjustable stage: There is a tradeoff between resolution and sampling, that we can control.

The potential applications of the technique are numerous: imaging in low signal conditions, e.g. with lack of illumination, driver assist systems, microscopy of delicate photosensitive biological samples, high frame-rate imaging, among others. Given its low power requirements and reconstruction speed it can find applications in the areas of computer vision systems for unmanned vehicles, especially in the harsh environments, security, microscopy and many other applications. Specifically, given the possibility to work with pulsed lasers, one envisions energy efficient and spectroscopic applications of the proposed approach. It should be specifically noted that technique does not require a CW laser, thus it is not limited by the coherence length.

A number of photonic structures are possible to use as a topological phase modulator in example configurations. Although the invention is not so limited, selected examples of suitable photonic structures are described in examples below.

Multi-scale structures have been developed for a variety of energy- and sensing-related applications. In this communication, we show how such structures, due to their capacity to filter color and polarization, are particularly useful in computer vision. While either material anisotropy or surface patterning alone is capable of shaping the properties of light, the combination of both, in multi-scale structures, may enable sharp spectral and polarization filtering and enhance resolution and multimodal imaging in computer vision applications. To our knowledge, the production of multi-scale, monolayer photonic structures has not yet been demonstrated in a synthetic material fabricated by bottom-up methods.

In nature, however, many species have evolved to form complex structures with multiple scales of order, which makes them highly sensitive to specific colors and different degrees of light polarization. Even though humans do not sense the vector quality of light, many insects sense polarization. Polarization may be influenced by optical scattering, refraction, and reflection or the propagation through anisotropic materials. Low-loss polarization-sensitive optics would provide opportunities in novel sensing capability: e.g., to remove the effects of scattering and improve imaging resolution, to image through turbid water or cloudy environments. In fact, several cameras recently on the market today carry spectral and polarization-sensitive pixels.

Opportunities for inexpensive and compact implementations of polarimetric cameras lie in computer vision algorithms, which obviate hardware requirements by extracting and deconvolving information from camera images instead of moving parts. Such approaches may leverage optical encoders, diffusers, metamaterials, or lensless methods. The hybrid implementation containing photonic and electronic processors reduces the time, power, memory, and complexity of the application, or provides additional information in a single sensor shot for image enhancement.

In our research, instead of dielectric or metal metamaterials, we show that multi-scale conducting polymer assemblies provide tremendous potential for compact computer vision and imaging applications especially for larger-surface applications: e.g., surfaces with areas of the size of camera sensors ($\sim cm^2$). Conducting polymer assemblies are analogous to metasurfaces with sub-wavelength metallic domains but with low transmission losses and numerous opportunities for inexpensive, large-area fabrication over flexible and non-flat substrates. Nevertheless, the proposed implementation of multi-level bottom-up nanostructured materials in photonics applications is a challenge not only because of the high precision required, but also because of the synthesis. Given the nature of self-assembly, multi-scaled domains form simultaneously and may not be controlled independently. Meanwhile, to be effective, the optical response from anisotropy and patterning must work in concert.

In this work, we successfully integrate material anisotropy at the nanoscale with photonic crystal structures and demonstrate enhanced polarization-dependent scattering. We select polyaniline (PANI) as the material and fabricate multi-scale features in photonic crystal films via a bottom-up approach. PANI is a linear polymer with rich chemistry and tunable electrical and optical properties. This material's low cost and toxicity, ease of synthesis, higher stability compared to other conducting polymers, and good compatibility with a variety of material types make it a promising candidate for energy storage, optoelectronics, spintronics, sensing, and biomedical applications. Its physical properties are also flexible: they can be changed dramatically by varying the synthesis environment. We harness its capacity to form nanofibers when the monomers are distributed freely in solution. When aligned, it has been shown that the nanofibers respond actively to switch the absorbed polarization of light.

In our approach, the nanoscale anisotropy is generated by PANI's fibrous structure and the photonic structure is achieved by filling the interstitial voids of close-packed polystyrene (PS) nanosphere assemblies with PANI. After removing the PS, we obtain two-dimensional PANI inverse-opal films (IOFs) with open pore structures. The ordered structures yield strong, polarization-dependent diffraction and sharp, angular separation of colors. The strength of the diffraction is surprising: although the dispersion of this mode follows that of a Bragg feature, which is associated with multi-layered crystal, the scattering only occurs through interaction with a monolayer structure. We attribute the strong polarization response to the combination of the material anisotropy of the bulk aligned nanofiber structure and the nanobowl arrays wherein light experiences multiple-scattering Result and Discussion PANI IOFs (as well as other IOF structures) are generally synthesized through hard-templating strategies, which involves the fabrication of PS assemblies and polymerization of PANI through either chemical or electrochemical deposition. The chemical oxidative polymerization at the air/water interface leads to the open-pore structures of the IOFs and confines the regular growth of the PANI chains.[42] A schematic illustration of the synthesis is shown in FIG. 10a. The entire process is divided into interfacial assembly and chemical oxidation polymerization. In a typical synthesis, the PS film of close-packed nanospheres is formed by slowly dripping a suspension of 5 wt % PS nanospheres in ethanol and $H_2O$ (v/v=1/1) to the air-water interface. Absorption of the PS nanospheres at the air-water interface is thermodynamically favorable and solvent convection squeezes the nanospheres into the close-packed assemblies. The PS film is collected on a glass substrate, left to dry, and transferred to the PANI synthesis solution. During the transfer, due to the minimization of surface energy, the PS film peels off of the substrate and settles on top of the solution. It is worth noting that applying a PS nanosphere suspension directly to the surface of the polyaniline synthesis solution results in a low-quality film: the low pH of the synthesis solution leads to the formation of a PS assembly with random structures. In addition, any presence of ethanol inhibits the uniform deposition of polyaniline.

The multi-scale morphology is evident from SEM images. FIG. 10b-e shows the morphology of the PANI-IOFs with pore sizes of 220, 485 and 670 nm (using 250, 531 and 727 nm PS nanospheres as the templates. The SEM image shows that the PANI-IOF is composed of a monolayer of nanobowls (FIG. 10d). The height of the nanocup (h) is calculated from the size of the opening of the nanocup (d) to the radius of the PS nanospheres (R): $h=R-(R^2-(d/2)^2)^{1/2}$.

The nanofibers themselves maintain a similar shape compared to the nanofibers in solution (FIG. 10h). The cross-section of the fibers (FIG. 10f, inset) indicates that the nanofibers are vertically aligned with the sample plane. Pore-adjacent nanofibers are much thinner than those in solution as their growth is confined by the voids between the PS. Their alignment is also observable from the SEM images (FIG. 10g), which show the spiny protrusions pointing from the nanobowl to the substrate. This formation of the nanofibers is due to the low concentration of the monomers absorbed on the PS surface, which does not support secondary growth. Here, two degrees of order are achieved: IOFs composed of spherical nanovoids and the packing of nanofibers around the pores. This multi-scaled ordering works in concert to filter the transverse-electric (TE) polarization.

FIGS. 10h, i and j show the coating of S2 on a 1 $cm^2$ glass slide, a 1 $cm^2$ silicon wafer, and a convex lens (6 mm in diameter); these examples illustrate the versatility of the synthesis method. Another advantage of this synthesis approach is that the ordering of the IOFs is tunable, determined by the surfactant-controlled ordering of the PS monolayer film. The attractive and repulsive forces between nanospheres are balanced by adjusting the assembly conditions, such as the solvent types, pH of the water, concentration of the PS nanospheres and surfactants. It is important to note that for PS nanospheres, the strong hydrophobic-hydrophobic interaction that brings nanospheres together and plays a negative role during assembly. It is critical to modify the nanospheres with surfactants to overcome such forces. FIG. 11a-d shows the assemblies of 250 nm PS nanospheres with 0-0.5 mM of Triton X100. The ordering of PS nanospheres increases when the concentration of Triton X100 increases from 0 to 0.3 mM, and remains when the concentration is further increased to 0.5 mM. We choose 0.3 mM Triton X100 to obtain a highly-ordered structure.

Figure 11:
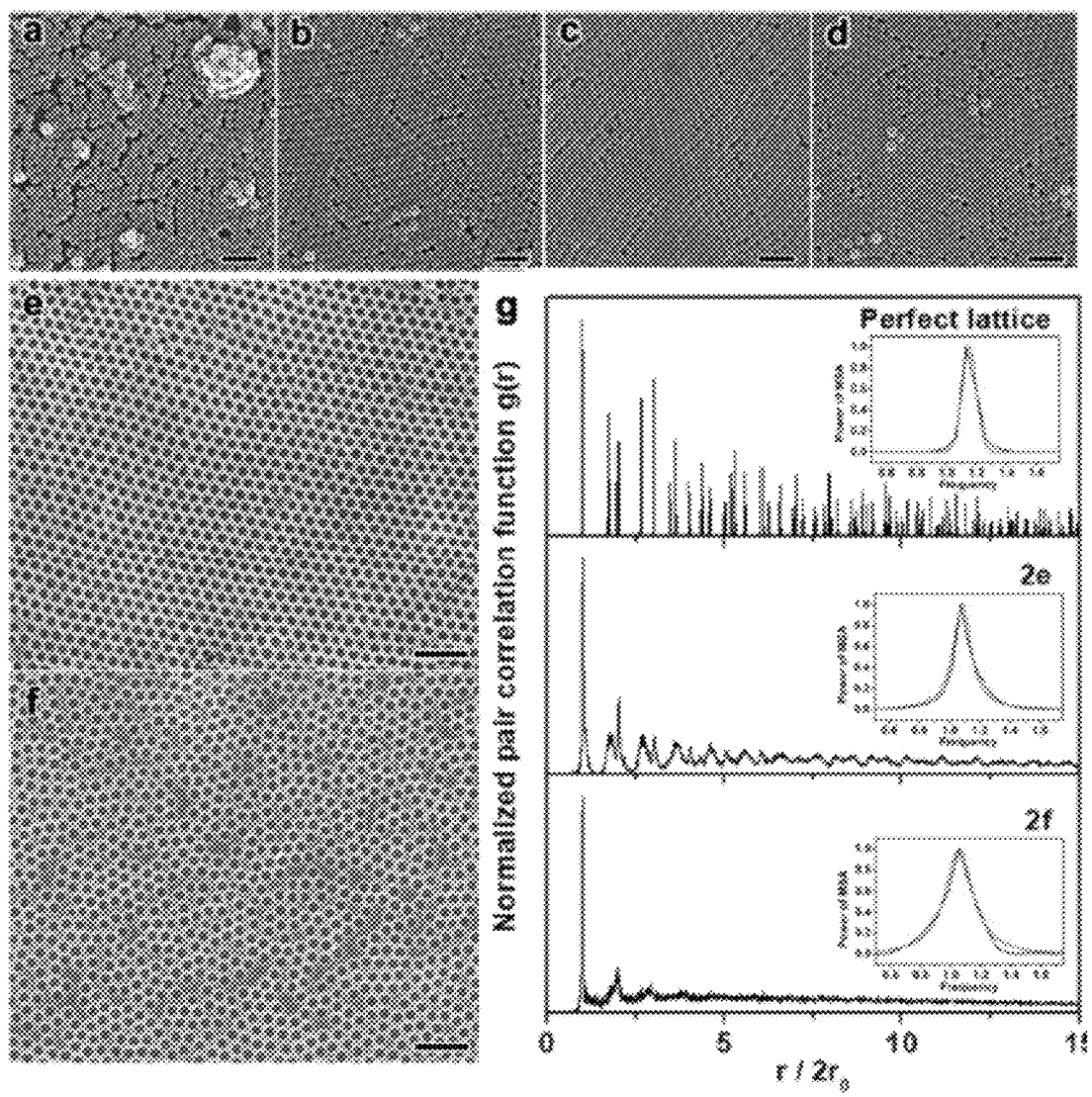
FIG. 11. SEM images of PS assemblies formed with (a) 0, (b) 0.1, (c) 0.3, and (d) 0.5 mM Triton X100. An illustration of the method used to determine the pair correlation function. SEM image of (e) an ordered and (f) a random PANI-IOF with the center coordinates of the pores extracted (labeled with green dots) and mapped back onto the image. The outer green ring shows the maximum area of the image used for the calculation. (g) Calculated pair correlation function (PCF) from sample shown in (2e and 2f) and PCF for a perfect lattice as a function of $r/2r_0$, where $r_0$ is the mean radius of the pore. The inset shows the Fourier Transforms (black line) and fitted curve (red line) of the PCF for the perfect lattice and PANI-IOFs.

To quantify the degree of ordering by using this synthesis approach, we analyzed the hole distribution of an ordered and a random sample (FIGS. 11e and f), and calculated their 2D pair correlation function, g(r) (FIG. 11g), as shown below, $$g(r) = \frac{1}{\langle \rho \rangle} \frac{dn(r, r+dr)}{da(r, r+dr)}$$

where a is the shell area and dn is the number of holes that lie within a spherical shell.[46-47] The statistical average of holes is normalized by the average particle number density (p) and the sampling area da=2πrdr. The inset of FIG. 11g shows the Fourier transform of g(r). For both samples, we compare the full width at half maximum (FWHM), κ, for the first peak of $g(r)^{-1}$ to that of a perfect lattice ($κ_O$). We use the ratio of $κ/κ_0$ to quantitively determine the ordering of the photonic structure. A structure with $κ/κ_0$<1.5 is considered very highly ordered. The $κ/κ_O$ for samples 2e and 2f are 1.25 and 1.98, indicating the tunable range of PANI-IOFs.

Figure 12:
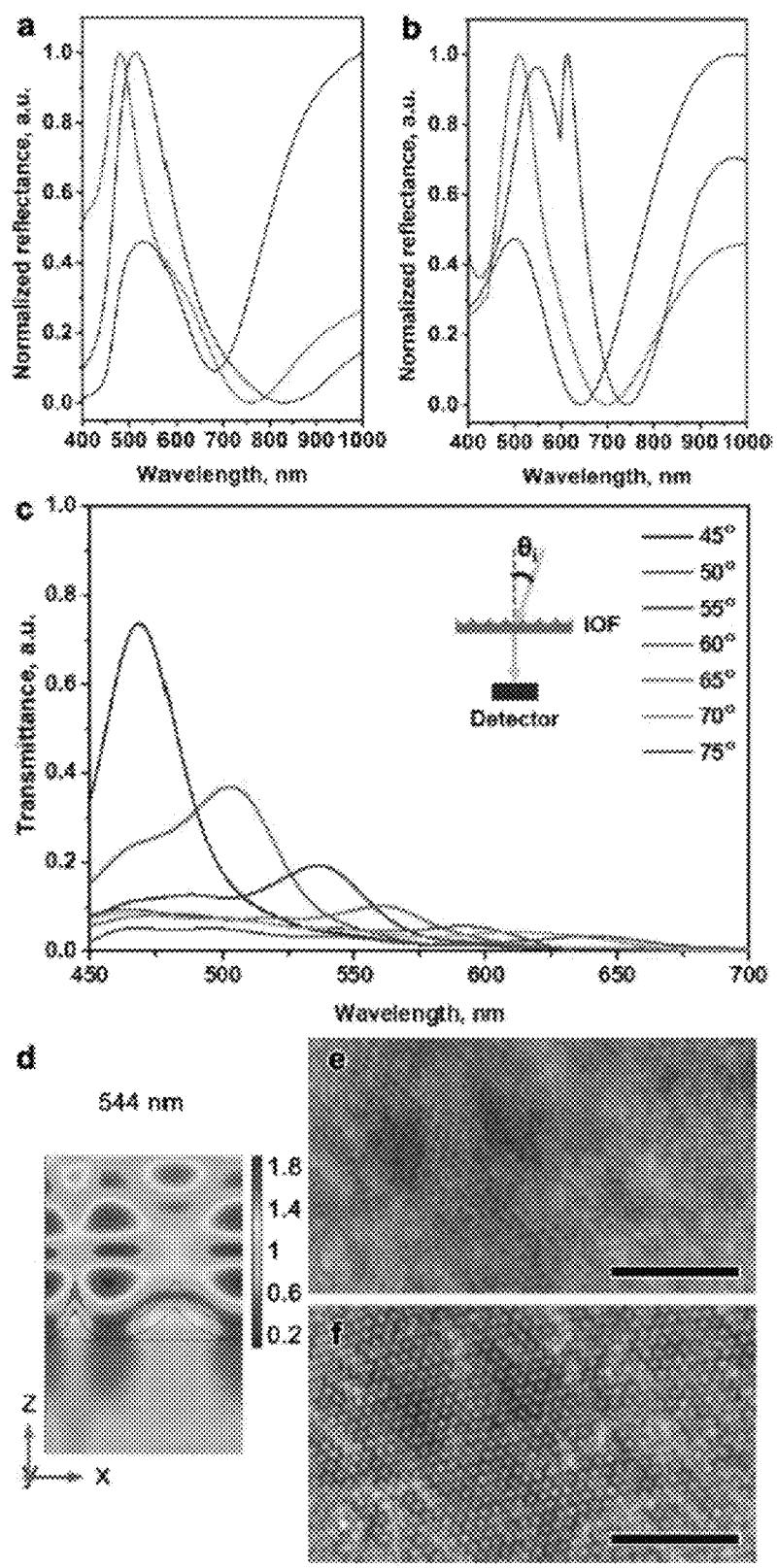
FIG. 12. Reflectance spectra of S1 (black), S2 (red) and S3 (blue): (a) experimental data, and (b) simulated data. (c) Dispersion of transmittance showing the structural color of S3. The detector is fixed along the sample normal, while the incident angles ($\theta_i$) increases. The angles in (c) are values for the $\theta_i$ shown in the inset. (d) Simulated electric field distribution of S3 at 544 nm, with hot spots above each void. Optical microscopic images of S3 (e) at the bottom of the pores in the substrate and (f) above this location. The scale bars are 20 μm in (e and f).
Figure 12G:
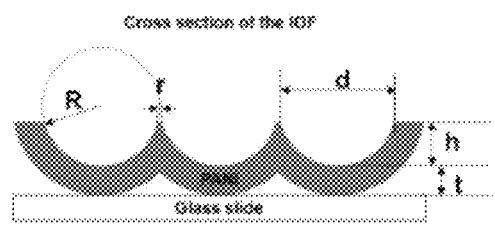
FIG. 12g. shows dimensions of example structures.

The highly ordered IOFs define crystalline planes (or lines) in three different directions that form angles of 120° between each other. The periodicity T of these lines is given by the expression, $T=(d+r)\sin(60°)$, where d and r are the sizes of the pore and the edge, respectively (FIG. 12g). This leads to periods of 235 nm, 508 nm and 695 nm for samples S1, S2, and S3, respectively. For normal incidence the first order disappears for wavelengths greater than the period T. We have carefully analyzed the optical properties of the samples. FIG. 12a shows the normal-incidence reflectance of the PANI-IOFs. S2 and S3 exhibit sharper reflection peaks than S1, and the peak redshifts 35 nm with an increase of the pore sizes for S2 and S3. By comparison with the reflection of a nanofiber film-which only shows broad absorption in the PANI emeraldine salt polaron structures—we attribute the sharp peaks in S2 and S3 to the periodic voids in the IOFs.

Much like other nanostructured coatings, the PANI IOF coating increases the field of view. If we include the possibility of imaging with the diffracted mode, then the effect of the PANI IOF on field of view is dramatic. Since our structure behaves like a grating, the diffraction mode depends on the color. The structural color of S3 is evident where the detector is placed on the axis of a flat sample (FIG. 13c). When the incident angle increases from 45° to 75°, the peak redshifts in the visible light range. We have no difficulty imaging an object projected with an incident angle of 75° using the diffracted mode. We estimate the effective angular field of view to be over 170 degrees, which would not be uncommon for anthropod-inspired imaging systems.

A comparison of the experimental results with COMSOL simulations identifies the effects of pattern imperfection and material anisotropy; the COMSOL simulations assume ideal periodic structures and material homogeneity. The modulation of the PANI IOF reflection spectra is consistent with COMSOL simulations (FIG. 13b). This indicates that there is a combination of thin-film interference and scattering within the PANI, which shifts with different pore sizes. The features we identify in our calculations are around 623 nm and 450 nm, for S3 and S2 respectively, and correspond to Rayleigh anomalies that occur when a diffraction order becomes evanescent. Due to the crystalline disorder present in the samples, these features are not visible in the experimental data. These results also highlight the importance of the ordering of the IOFs and nanofibers, since light is strongly-depolarized via scattering with more random structures.

To understand how light interacts with the periodic voids, we map the electric field distribution of S3 at different wavelengths, which reveals field enhancement above the voids. As shown in FIG. 13d, with 544-nm wavelength illumination (a resonance wavelength of the periodic void structures) the field enhancement reaches its maximum value at the opening of the nanobowls (FIG. 13d). We confirm this strong light enhancement experimentally by observing S3 under an optical microscope. As shown in FIGS. 13e and f, when the microscope is focused slightly above the sample plane, a bright spot is visible above each void. There are similarities between the PANI IOFs here and elemental metal IOFs, which also exhibit such hot spots over each void.

Measurements of the specular reflectance of the samples are shown in FIG. 14 for angles of incidence between 18° and 78°. A schematic illustration of the optical setup for the measurement is shown in FIG. 14a. The sample on a glass slide was mounted on a rotation stage and excited by a white light source. A polarizer is placed in front of the light source to illuminate the sample with TE (or s-) and TM or (p-) polarization. The specular reflection ($\theta_i=\theta_D$) spectra are normalized by the intensity of the incident light and presented in FIG. 14b. The PANI-IOFs show higher reflectivity in TE than in TM polarized light. No diffraction effects are expected within the range of parameters explored in this figure. The void size of sample S1 is too small to produce significant details in the reflectivity data, which is similar to the flat surface response. With the TE-polarization, we see a monotonic increase in the reflectivity as a function of angle and, as a function of wavelength; this behavior seems to be dominated by the changes in the refractive index of PANI. In the case of TM-polarization, we note the presence of a Brewster angle minimum whose dependence on the wavelength follows the dispersion properties of PANI. As the voids become larger, for samples S2 and S3, the maps are distorted. Particularly interesting is the modification of the Brewster angle position and its shift to smaller angles for wavelengths around 700 nm. Discrepancies between simulations and experiments are more prominent with thicker layers and wider pore sizes, which indicates greater influence from the material anisotropy or pattern disorder in the PANI IOF.

The PANI-IOFs filter TE polarized light in the diffraction patterns in a manner similar to the resonant polarization-filtering linear grating. Simulations and experiments help us to assign about 3× polarization anisotropy to the inverse opal structure and an additional 6× higher transmission associated with the material anisotropy or nanowire alignment We characterize the transmission of TE- and TM-polarized light at angles with a fiber spectrometer, and calculate the ratio of transmission intensity. A schematic illustration of the measurement is shown in FIG. 14a and the corresponding spectra are presented in FIG. 5b-c. When $\theta_D$ is fixed at 15° (in our convention, the direct transmission direction is given by the condition $\theta_D=\theta_i$), the transmission spectra show similar patterns for both TE- and TM-polarized light. The transmission peak shifts with the angle $\theta_i$ in a manner that is expected to be governed by diffraction effects. From the grating equation, we note that the −1 order appears for angles of incidence determined by the equation $$\theta_i = \sin^{-1}\left(\sin\theta_D + \frac{\lambda}{T}\right).$$

A curve indicating this condition is superimposed onto the maps of FIG. 14b (black line), which coincides with the strong signal region. The high signal region observed for short wavelengths and small angles of incidence is due to scattering. We adjust the angle of polarizations (P) and extract the intensity values of the diffraction peaks at the fixed incident and detection angles ($\theta_D=15°$ and $\theta_i=30°$). Then, we calculate the ratio of intensity by dividing the diffraction intensity (I) by its maximum value ($I_0$). As shown in FIG. 14d, PANI-IOF reaches its maximum at P=0° (TE-polarized light) and gradually decreases when P increases to 90° (TM-polarized light), indicating that almost all TM polarization is filtered by the PANI-IOF. A comparison of the polarization-dependent transmission of the PS assembly, the PS assembly coated with PANI, and the PANI IOFs (FIG. 14d), indicate that the PANI-IOF exhibits contrary behavior. Furthermore, it is important to note that the TM-polarized light excites almost no diffraction peaks.

Figure 14E:
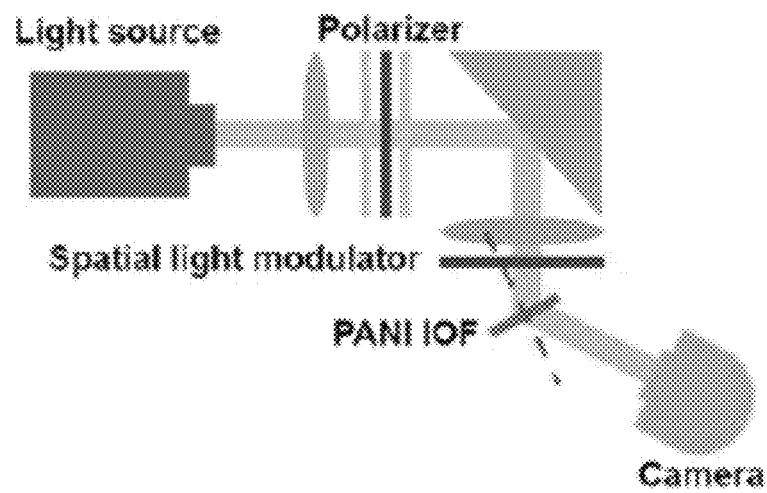
Figure 14F:
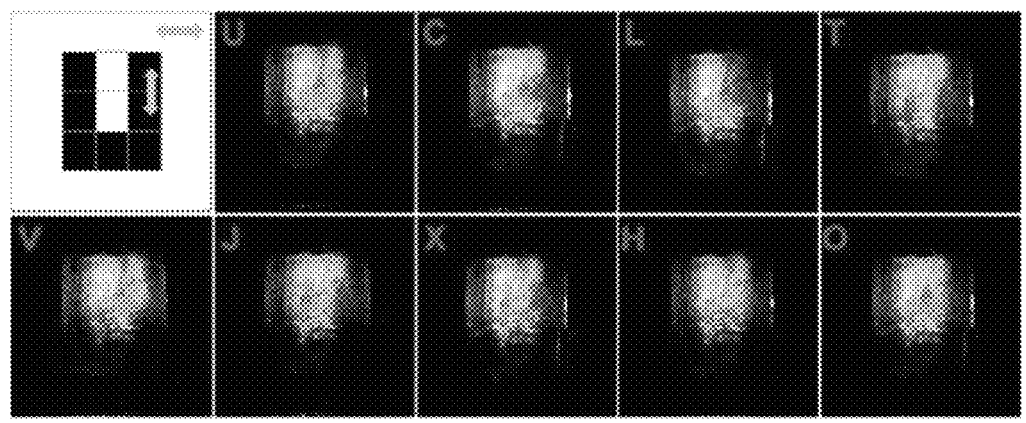

The polarization-dependent diffraction is useful for polarimetric imaging. We generate varied spatial polarization patterns with a spatial light modulator in the path of a white light source (FIG. 14e). The spatial light modulator rotates the linear polarization of the input beam, as shown in the upper-left corner of FIG. 14f, where the letter "U" is s- and p-polarized for the letter area and the background, respectively. What is remarkable about our setup is that no additional color or polarization filters are used to distinguish the SLM shape with the naked eye. This experiment confirms the active and sensitive response of the PANI-IOFs to polarized light.

We attribute the polarization-dependent structural color of the PANI-IOF to its multi-scale structure: the ordered nanovoids and the alignment of the PANI nanofibers. The former contributes to Bragg-like modes and the latter enhances the polarization sensitivity. In fact, PANI IOF carries a similar multi-scale geometry to the resonant, linear structures that others have fabricated with top-down methods, where in-plane anisotropy in a grating structure strong TM-polarized diffraction. Meanwhile, our samples with out-of-plane nanofiber alignment exhibit the opposite, or TE-polarized diffraction. Nevertheless, to confirm the effects of the material anisotropy, we synthesized an $SiO_2$-IOF film and measured its diffraction at different polarization angles. As compared to PANI-IOF, $SiO_2$-IOF shows similar polarization-dependent diffraction that is simulated in COMSOL, which is much weaker than that observed by PANI.

Controlled synthesis of multi-scaled monolayer PANI-IOFs with vertically-aligned nanofibers by chemical oxidation polymerization of PANI on PS arrays at the air-water interface are shown. Our versatile and reliable method achieves highly ordered photonic structures for a range of pore sizes, and is capable of large-scale synthesis over flexible and curved substrates. Experimental and numerical results indicate a combination of interference and multiple scattering effects within the PANI IOF. Such multi-scale conducting polymer photonic structures sort color and polarization information and are expected to be useful for compact polarimetric imaging, multimodal sensing, and computer vision applications.

Imaging devices utilizing neural networks are described above, along with selected examples of photonic structures that serve as topological phase modulators. Additional examples below describe generalized training of simple neural networks for use in the above described imaging systems and other systems.

Despite the benefits of using neural networks to solve inverse problems, there are also drawbacks. Some of these issues—especially those associated with phase retrieval—have been solved. Others—particular those related to generalizability, robustness, and processing time or energy—remain active areas of research. Since neural networks learn how to weigh the importance of information patterns based on training data, they exhibit a tendency to "memorize" patterns to gain intuition about the task. This predisposition towards prior data is advantageous for building "inductive, artificial intelligence machines" that extract patterns; however, that predisposition is a detriment to the generalizability of inverse solutions, e.g., for building real-time computational cameras. Three specific issues encountered by neural nets in imaging tasks include:

1. Small, sometimes undetectable perturbations in the input (both image and sampling domain) can cause severe artifacts in the image reconstruction.
2. Small structural changes can be left undetected.
3. More samples in the training set can lead to a deterioration of the results (as a result of the "memory" effect described above). Subsequently, algorithms themselves can stall or experience instabilities.

Whereas biomedical applications are aimed at large-image, high-quality image reconstruction, we turn our attention towards building real-time computational cameras for low size, weight, and power (SWaP) image reconstruction, which are needed for autonomous-vehicle applications. In our prior effort, we demonstrate reconstruction with a "small brain" dual-layer neural network. Such regression-based approaches demonstrate fast reconstruction rates, robustness to noise, and show potential for generalization with a phase vortex encoder. Here, we focus entirely on the generalizability of a simple neural network using a single-layer architecture for image reconstruction. We supply the model with a generalized or Universal Training Set (UTS) (synthetic images, used to train the neural network) and then test the neural network with images of different, unseen classes (see FIG. 15a). A UTS-trained model overcomes the challenges associated with the "stereotypes" that generally arise from training by a specific image set. On the other hand, some disadvantages include the fact that the neural network is too simple to reconstruct images when nonlinear transformations are required. Nevertheless, our results provide insight for training generalizable neural networks and computational cameras that operate at fast speeds. Our proposed method can readily be used for the initialization of alternating minimization problems or downstream image analysis tasks.

It is perhaps surprising that the simple learning model possesses enough capacity to recover a good approximation of the inverse coded-diffraction problem, and even with such a simple neural network there are interesting issues to address. In an effort to move towards producing a generalized training set, we compare the performance of the vortex encoder with other random encoders. From there, we build intuition for the UTS design based on the modal decomposition of the training, diffracted imaging patterns, and SVD-entropy. We also perform experiments, which build heuristics for real-world applications. We find that the choice of training images and optical encoder is important for achieving generalizability, since not all imaged patterns provide a unique mapping to be learned and not all learned intensity patterns aid image reconstruction. While we have not quantitatively analyzed the image reconstruction i.e., compared the set of training images to the span of the neural network, we observe that reduced SVD-entropy in the training set increases the learning efficiency, in both simulations and experiments.

In this section, we review an approach for our study of generalizable training. FIG. 15b shows a schematic of the hybrid machine vision system, which encodes the image prior to the neural network with either a random or vortex phase pattern.

The fields from the object at the diffractive encoder plane are $F(x,y)$. The encoder plane is imprinted with two diffractive element patterns $M(x,y)$, as shown in FIG. 15(c). A sensor or detector captures the intensity pattern of the electric fields $F'(u,v)$. Let F be the Fourier Transform operation $(x,y) \rightarrow (u,v)$, where we capture an image in the Fourier plane:

$$F'(u,v) = \mathcal{F}[M(x,y)F(x,y)]. \quad (1)$$

Light from each object produces two images, each with a different diffractive element $M(x,y)$. Although the mask pattern may imprint vector (i.e., polarization-dependent) or spectral (time-dependent) delays, here we assume a homogeneous polarization, a linear encoder, and monochromatic, continuous-wave light. All optical neural networks have been previously demonstrated, notably with several diffractive layers in the THz regime, with nonlinear activations via saturable-absorbing nonlinearities, and with nano-interferometric etalons in the visible regime. All-optical methods maximize speed and minimize energy loss in the neural computation. At the same time, all-optical systems require nonlinear interactions as proxies for the electronic neural network layer activations. These nonlinearities occur at small length scales in order to confine light sufficiently, so all-optical computing may be more sensitive to environmental conditions and less suitable for autonomous-vehicle computational cameras.

By contrast, we focus on hybrid imaging in which optical processing conditions sensor measurements and an electronic neural network performs reconstruction. Two phase masks are used to capture the intensity measurements of the object on the sensor, which are then fed to a no-hidden-layer neural network. At this time, we do not predict depth sensing with imaging, so the masks contain lenses for Fourier-plane detection. Here we reproduce the object based on the detector intensity patterns and assume that the detector is in the focal plane associated with a quadratic radial phase of the mask. In recent work, Fresnel mid-field imaging shows potential for better object-based depth detection.

We generate phase-modulated patterns, $$F(x,y)M(x,y)=e^{i\alpha X}G(x,y)M(x,y) \qquad (2)$$

where $G(x,y)$ is the Gaussian beam pattern illuminating the object and $X$ is the positively-valued original image. This Gaussian pattern represents a smooth pupil function or the illuminating beam. In our study, we fix $\alpha=\pi$ and find that the reconstruction quality does not change significantly when $\alpha$ varies from $\pi/4$ to $3\pi/2$.

The general inverse problem for mapping the detector measurements to the original image involves solving the following nonlinear system of equations:

$$Y=H(X)+N, \qquad (3)$$

or for our specific case, $$Y=|\mathcal{F}[e^{i\alpha X}G(x,y)M(x,y)]|^2+N, \qquad (4)$$

where $Y$ is the positively-valued sensor measurement, $H(.)$ is a nonlinear transform operator that includes the transfer function of the optics, light scattering, and the sensitivity curve of the detector, and $N$ is the measurement noise.

The Fourier-plane intensity patterns $Y$ are the inputs to a neural network. The neural network estimates $X$ (size 28×28) given $Y$ (size 28×28×2). To train the neural network, we use the TensorFlow library with the mean squared error loss and Adam optimization algorithm. Convergence is achieved with similar results using either "linear" or "ReLu" activation. Our approach is simple and shows promising opportunities for generalized image reconstruction with "small brain" neural networks.

Figure 15:
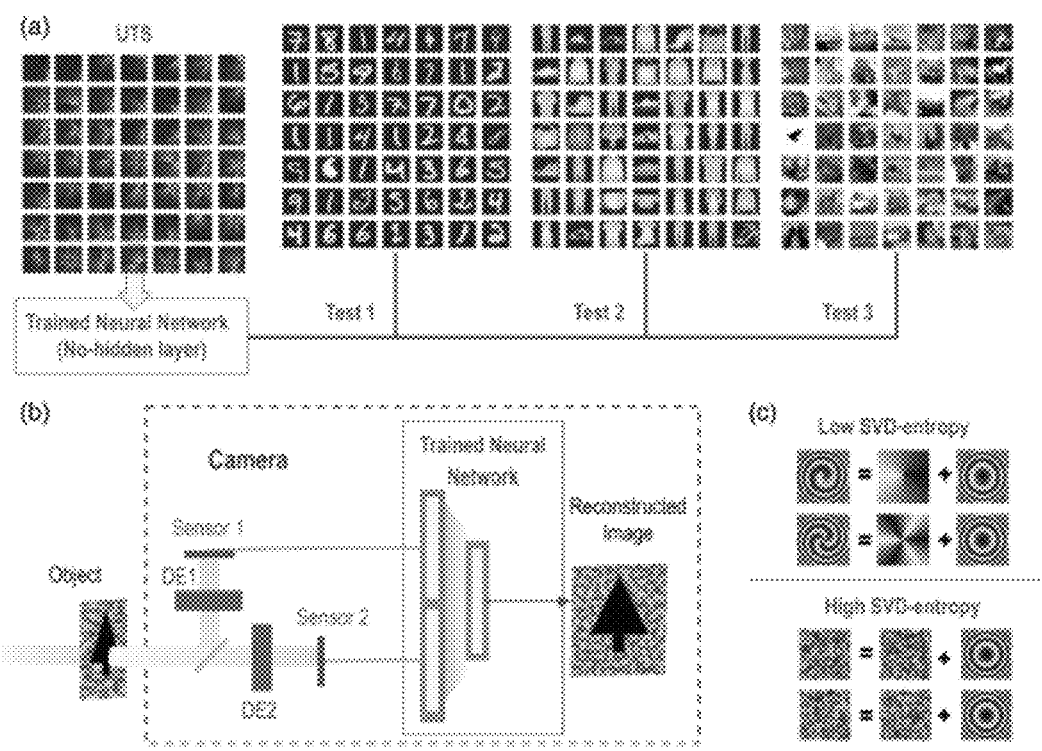
FIG. 15. (a) Project objective: design a generalized training set for a neural network, which can later be used for general image reconstruction without retraining and operate real-time. (b) Schematic of hybrid vision camera where light from an object is transmitted through a diffractive encoder (DE). Sensors capture two transmitted images that are combined as inputs to the trained neural network, which reconstruct the object from the detector-plane images. (c) This project employs two pairs of diffractive encoders: one with low SVD-entropy (lens and topological charge m=1 and 3) and the other with high SVD-entropy (uniformly-distributed random pattern).

We choose two pairs of diffractive encoders. One pair is composed of vortex masks, where each mask has an on-axis singularity of either m=1 or 3:

$$M(x,y) = e^{-(x^2+y^2)}\left(\frac{i}{f\lambda}+\frac{1}{w^2}\right)e^{im\phi}, \qquad (5)$$

where f is the effective focal length of the radial quadratic phase, $\lambda$ is the wavelength of light, m is an on-axis topological charge, and w is the width of the Gaussian beam illuminating the mask. FIGS. 15 (b,c) show diffractive elements with m=1, 3. The second pair is composed of random masks, where each pixel of the transmitted pattern is encoded with a random phase from 0 to $2\pi$. The mask is also illuminated with the same Gaussian beam. On the side of the training, we work with a range of images composed of 28×28 patterns that are random $X_R$ Fourier-based $X_F$, or shapes related to a vortex phase $X_V$.

We approach the generalized training to understand the modal distribution of each image X. In principle, the training images should span the space of the test images, which defines the requirements for reconstruction. This would suggest that each coded-diffraction Fourier-plane image should be decomposed into Fourier modes, since this common basis provides a unique and straightforward basis for each image. Such Fourier patterns are linear wave patterns that change with phase and vary with variables j, k, l, n:

$$X_{F(s_j,s_k,\phi_l,n)}(x,y)=\angle(e^{i(xs_j+ys_k+\phi_l)})G_n, \qquad (6)$$

where combinations of $s_j=2\pi j/dx$, $s_k=2\pi k/dy$, and k span the Fourier space intended to reproduce any arbitrary image and N. $G_n$ represents a scanning Gaussian beam with varied width and center, $$G_n(x,y)=e^{-[(x-x_n)^2+(y-y_n)^2]/w_n^2} \qquad (7)$$

where $x_n$, $y_n$, $w_n$ tune size of the UTS to be comparable to others. The size of the dataset also changes the phase shift, where $\phi_k=2\pi k$ and N is the number of the uniquely-valued wave fringes with wave numbers $s_j$, $s_k$ in $X_F$.

We refer to a "vortex training set" as a UTS composed of shapes similar to the phases of a vortex beam that have distinct edges and curves:

$$X_{V(x_j,y_k,\phi_l,n,l)}(x,y)=\angle\{e^{im_l \tan^{-1}[(y-y_k)/(x-x_j)]+\phi_k}\}G_{j,k,n^*} \qquad (8)$$

For the vortex $X_V$ as well as the random $X_R$ UTS, we use uniformly-distributed random variables to mask the pattern with a Gaussian profile. In other words, combinations of $x_j$, $x_y$, and $\phi_k=2\pi k/N$ span the dataset, or $$G_{j,k,n}(x,y)=e^{-[(x-x_j)^2+(y-y_k)^2]/w_n^2}. \qquad (9)$$

This Gaussian function $G_{j,k,n}(x,y)$ represents a scanning light beam that illuminates the training images. All image patterns are positively-valued and normalized to have a peak value of 1.

We produce three UTS that span the image space using up to 40,000 patterns. The goal of our project is to illustrate trends and intuition with these datasets.

Figure 16:
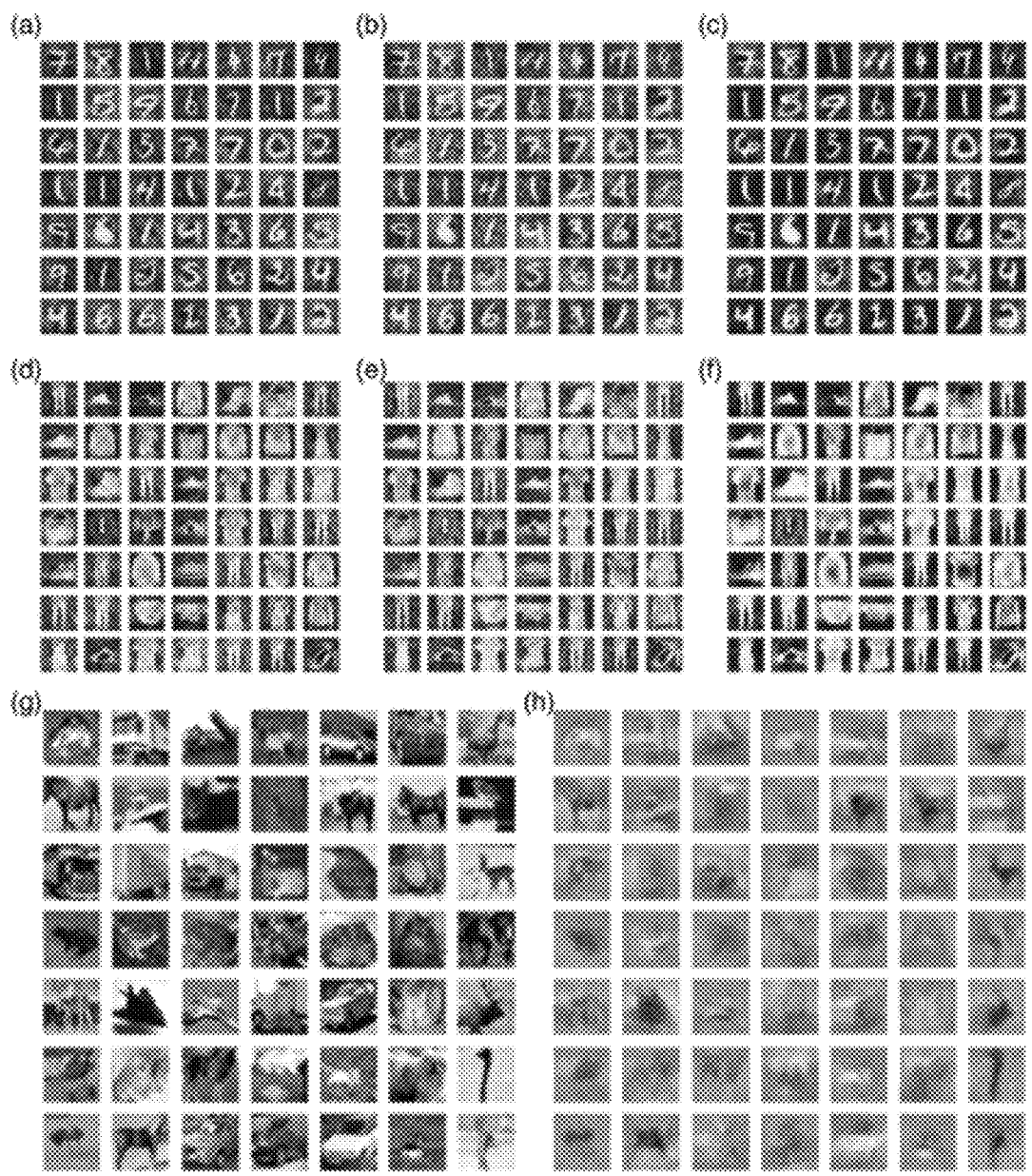
FIG. 16. Reconstructed images from (a, b, c) MNIST handwritten and (d, e, f) fashion MNIST datasets with random, Fourier and vortex bases, respectively. The vortex basis provides edge enhancement for object detection. (g) Ground truth and (h) reconstructed images from the CIFAR-10 dataset using the vortex training bases and a vortex mask as the encoder.

Once trained with a large dataset, we observe that the dense neural network without hidden layers can approximate almost any shape-based image (MNIST, fashion MNIST, CIFAR). An example set of reconstructed images from different classes is shown in FIG. 16. FIG. 16 shows a representative set of images reconstructed from models trained with $X_F$, $X_V$, and $X_R$ and a vortex mask. In each case, 20,000 training images are used. Error with thresholding is as low as 10% with test datasets. While the overall error is similar, models trained with the vortex-phase datasets, $X_V$ generally have the lowest error and strongly highlighted edges. Meanwhile models trained with a Fourier basis $X_F$ have the highest error and models trained with a random basis $X_R$ have error in between, with error distributed over the area of the image. Additional differences are explained in the following section.

Figure 17:
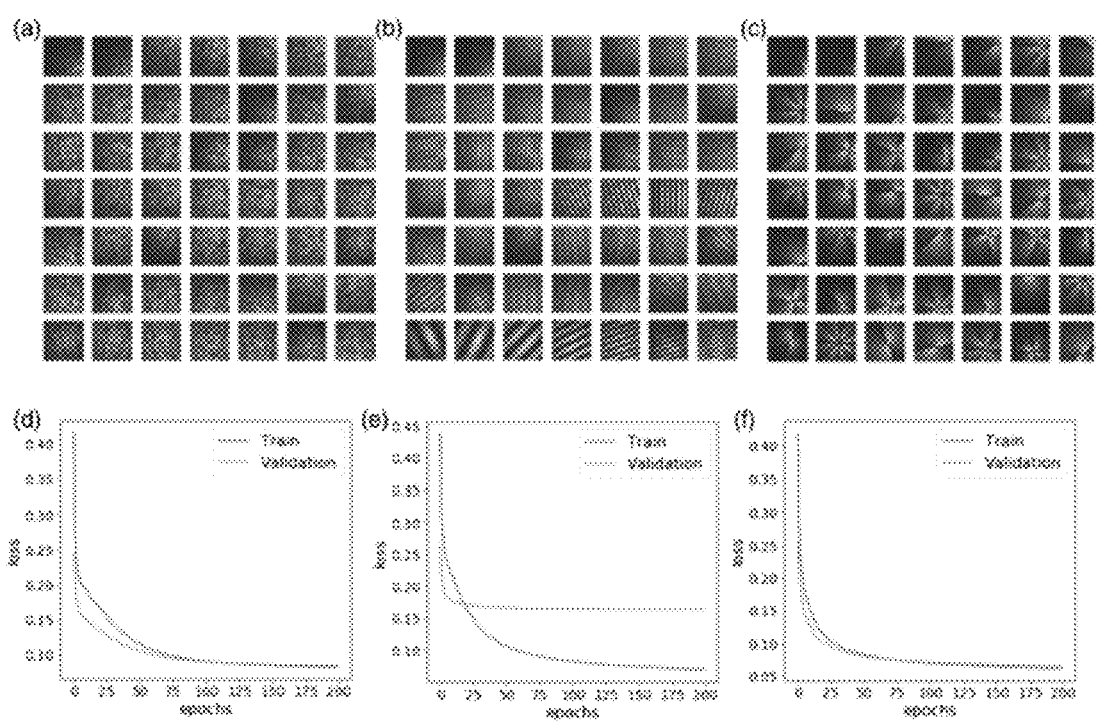
FIG. 17. (a)-(c) Sample training images $X_R$, $X_F$, and $X_V$ or random, Fourier, and vortex training sets. (d-f) Corresponding training and validation curves.

With this simple neural network and three different UTS, we observe trends in convergence and overfitting. These trends consistently depend on the choice of the UTS patterns regardless of the choice of mask $M_V$ or $M_R$. FIGS. 17a-c show samples from 20 k-image $X_F$, $X_V$, and $X_R$ UTS with the vortex mask $M_V$. Some pairings converge with minimal overfitting while others do not provide enough information in Y to calculate the inverse of the nonlinear mapping, H(X) FIG. 17d-f.

A Fourier basis is the most well-known spectral basis for decomposing an image. When training with a Fourier basis, the validation loss stops decreasing after a certain number of epochs, which signals that the neural network struggles to extract information about the mapping given this orthogonal set of images. What this tells us is rather unintuitive about the span or basis of image reconstruction with neural networks. The images are less effectively learned by the neural net because there is minimal overlap between them; the correlations between Fourier modes are less visible to the neural net.

The random UTS also unreliably converges when the dataset is smaller than 2 k, and its loss generally shows a "hill," where the loss plateaus before dropping. Meanwhile, the vortex-based UTS is less prone to such behavior. This combination of trends tells us that neither orthogonality nor randomness is ideal for training a neural network. The structured pattern of our vortex-based UTS $X_V$ is a better candidate for generalized training compared to random $X_R$ or Fourier $X_F$ patterns. In our discussion, we provide some measures related to the UTS image analysis and trained model robustness.

Figure 18:
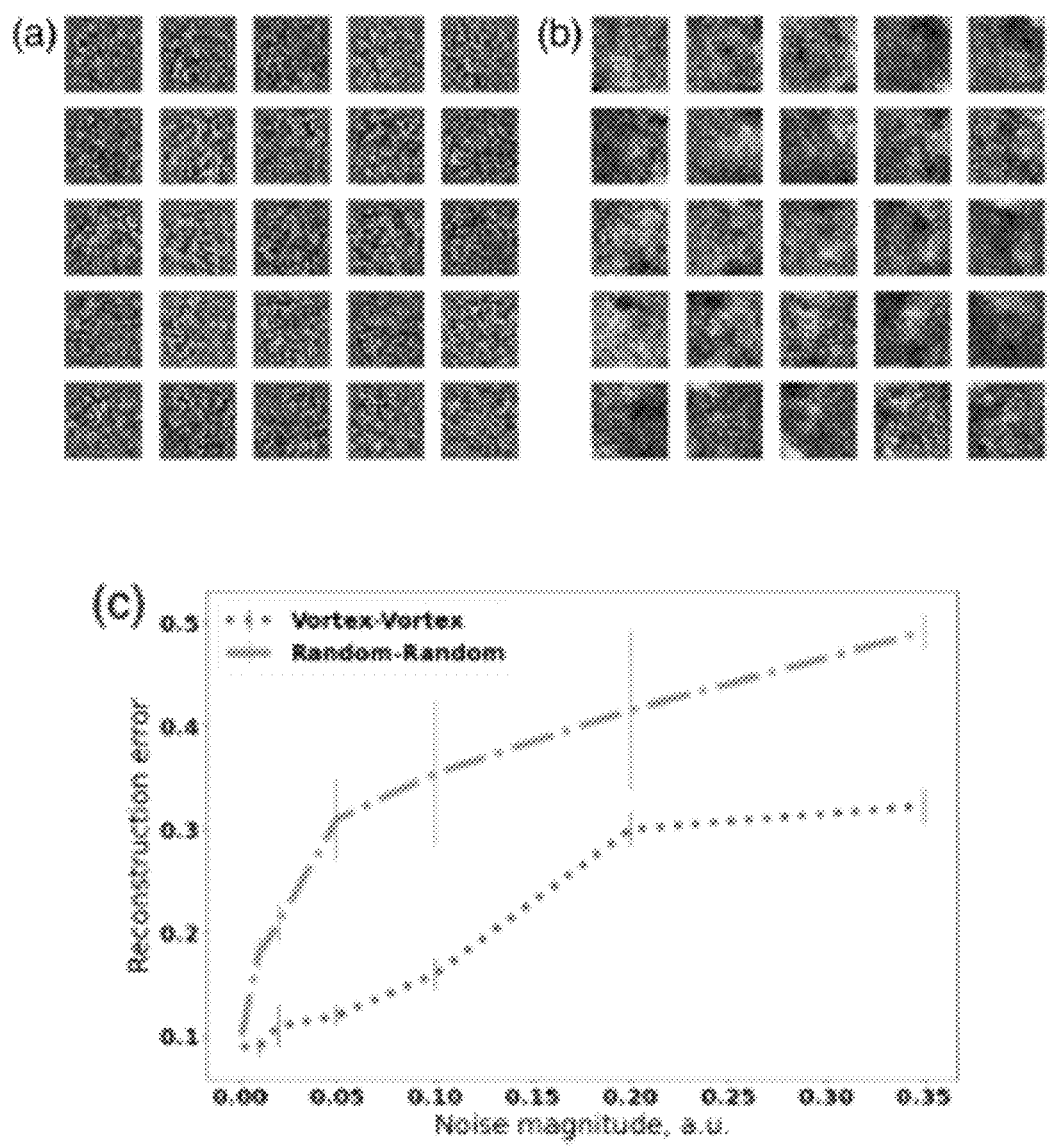
FIG. 18. (a) Single "hot" pixel response of the random model and (b) single-pixel response of vortex model, which demonstrates sharp edges and resolves high-contrast objects. (c) Comparison of reconstruction error for different levels of noise given high-entropy random UTS and random mask and lower SVD-entropy vortex UTS and vortex mask. This error corresponds to the scenario in which shot noise dominates the background noise.

In this section, we discuss the ability to recreate sharp images, which may be seen by the single-pixel response. The single-pixel response from the random UTS-trained neural network is sharply corrugated FIG. 18a, whereas the structured, single-pixel images from the vortex-trained model is generally smooth with a sharp "hole" in the center or dark spot FIG. 18b. We claim that these differences in the impulse response are responsible for the edge-enhanced reconstruction of shapes in FIGS. 16c and 16f. FIGS. 18a and 18b illustrate example images reconstructed with just one "hot" pixel in the camera sensor plane. These patterns are the building blocks of the reconstruction scheme and these patterns change depending on how the model is trained. Depending on the training set, the model is tuned to pay attention to different features of the image, which may depend on the task at hand.

FIG. 18c provides a simple noise analysis that shows the additional advantage of robustness when the neural network is trained with a low-entropy UTS. We show the reconstruction error as a function of noise magnitude. Poisson shot noise and background noise are added to the Fourier-plane intensity patterns of the test image set. Low SVD-entropy image training and encoders appear more robust.

In order to estimate complexity of the pattern we employ the measure of entropy. We approximate the 2D entropy of the images using the spectra of singular value decomposition (SVD), which describes the complexity of an image. Unlike Shannon entropy, SVD-entropy illustrates the mixture of spatial modes that are present in an image.

We use a normalized relation for the SVD-entropy that is invariant with image intensity scaling:

$$E_{SVD} = -\sum_{1}^{K} \overline{\sigma_j} \log_2(\overline{\sigma_j}), \quad (10)$$

where the argument $\overline{\sigma_j}$ is the normalized magnitude of the singular values or the modal coefficients of the image, given as $$\overline{\sigma_i} = \frac{\sigma_i}{\sum_{1}^{K} \sigma_i} \text{ and } \sum_{i} \overline{\sigma_i} = 1, \quad (11)$$

where K is the number of singular values and $\sigma_i$ are the singular values.

Figure 19:
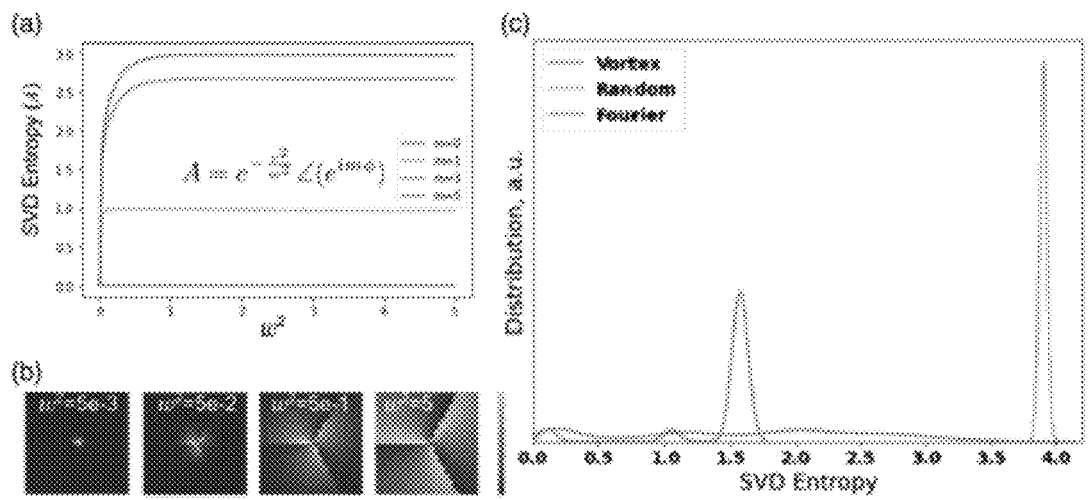
FIG. 19. (a) SVD-entropy of a structured pattern composed of the phase of a vortex (modulus 0, $2\pi$) and a Gaussian mask with radius of $w^2$. A few-pixel pattern has almost zero entropy, and the SVD-entropy saturates for a vortex depending on the topological charge. (b) Illustration of these patterns with $w^2=[5e-3, 5e-2, 5e-1, 5]$ corresponding to SVD-entropy values of [0.94, 1.8, 2.6, and 2.7]. The SVD-entropy strongly relates to the length of the edge dislocations of an image. (c) Histogram of the SVD-entropy in the vortex $X_V$, Fourier $X_F$, and random $X_R$ generalized training sets implemented in this project.

Some trends related to the SVD-entropy are illustrated in FIG. 19. If images in the set have several high singular values $\sigma_i$, the images may be reconstructed using fewer "elementary" patterns; those with higher entropy require many more patterns to achieve enough reconstruction accuracy. Low SVD-entropy images are smoother with fewer edges. On the other hand, images with many discontinuities exhibit a high degree of SVD-entropy.

From our analysis of differently structured patterns, the SVD-entropy scales logarithmically with the edge steps or dislocations in an image (FIGS. 19a and 19b). In this illustration, we plot the phase of an m=3 vortex with varied Gaussian-beam filtering. The measure of 2D SVD-entropy aids our analysis of the UTS. The vortex UTS has a broad range and lower values of SVD-entropy in contrast to the random UTS (FIG. 19c).

Pertaining to our efforts towards generalized training or a UTS, we see that a low SVD-entropy training set like that with structured patterns $X_V$ allows us to extract the structured (low SVD-entropy) information from the data (FIGS. 16c, 16f, 16g, and 16h). This effectively acts as a filter for salient features of the image. This low SVD-entropy training would be useful for some specific tasks, especially when, e.g., we are less interested in the image's background information than in the foreground object.

Figure 20:
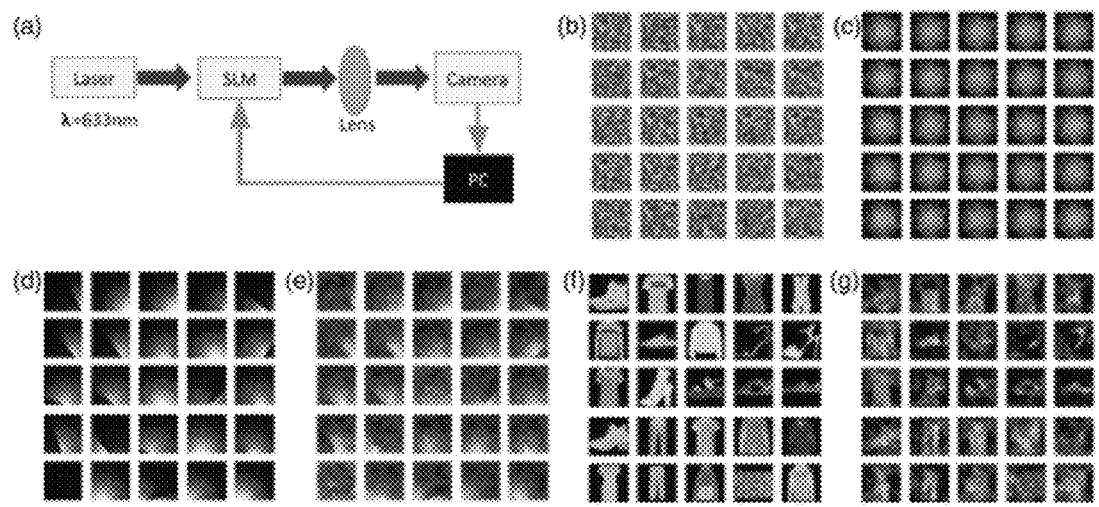
FIG. 20. (a) Schematic of experimental reconstruction with UTS. There is no spatial filter or polarizer, images are noisy and at this wavelength, the modulation dynamic range is only $\alpha=\pi$. This was done intentionally to simulate poor experimental conditions with background light. (b) Sample random UTS images and (c) sample reconstructed images produced by random patterns, which are not learned by the simple neural network model experimentally. On the other hand, (d) simpler images with fewer edges are (e) reconstructed by the neural network. (f) Sample ground truth images and (g) discernable reconstructed patterns when the neural network is trained by the vortex dataset.

To illustrate the potential and the impact of our approach for generalizable training, we show heuristic experimental results. In simulations, almost any encoded diffraction pattern with a mask presents a learnable map for a simple neural network. However, in practice when noise is present, neural networks do not always converge. Our experimental data show that under noisy experimental conditions where light is unpolarized and the sensor data is collected with significant levels of noise, the high SVD-entropy dataset is not suitable for the task of image reconstruction: background light and distortions render a high SVD-entropy training image useless since the neural network does not learn the pattern. By contrast, a neural network trained on low SVD-entropy images is capable of recovering reasonable approximations of the unseen images, as shown in FIG. 20.

Our experimental setup consists of a 633-nm Helium-neon continuous-wave laser, microscope objective, HOLO-EYE Spatial Light Modulator and focusing lenses, and a CMOS 8-bit camera (1280×1024 pixel resolution). The setup does not include polarizers as part of the design to provide a large-background and an unmodulated signal to test the limits of image reconstruction with a simple neural network. As a result, we are unable to recover images with the zeroth-order transmitted pattern. When we instead collect the sensor data at the first diffraction maximum, we are successful with image reconstruction but only with the vortex UTS. For reconstruction purposes, small square patches of the detector pattern are taken (e.g. 50×50 pixels).

In our experiments with imperfect spatial beam profiles and background unmodulated noise, the simple neural networks do not converge with random masks (the results are shown in FIGS. 20b and 20c. Experimentally, we demonstrate two masks shown in FIGS. 15c and 15d, which are successfully learned by the neural network. The low SVD-entropy dataset composed of shapes with straight edges and curves, i.e., $X_V$ converges but the high SVD-entropy random $X_R$ patterns do not. Again, we find it more difficult to train a simple neural network with a high SVD-entropy UTS.

Corners, edges, and higher-order solutions are a challenge in image reconstruction, requiring a higher degree of superposed waves. This more complex representation of images is the definition of SVD-entropy in an image, and suggests that the reconstruction of such images requires the learning of images composed of high SVD-entropy patterns. We find, however, that this is not always the case when aiming for robust neural network-based reconstruction. In fact, generalized training with low-entropy patterns recreates these sharp features well with edge enhancement.

We show that a simple neural network without hidden layers is capable of learning generalized image reconstruction. With this simple architecture designed to approach generalized training, it is evident that not all generalized data sets are equal. When we compare the convergence of differently structured datasets such as handwritten digits and fashion MNIST, a set of images or encoder based on vortex phase patterns (structured, low SVD-entropy, a combination of edges and curves) yields image reconstruction with lower error than a high SVD-entropy random encoder pattern that contains many edges. With a dataset such as CIFAR, the salient features are preserved in image reconstruction using a vortex UTS.

We have previously shown that a convolutional neural network can outperform a single layer neural network but with significantly higher energy cost. The deep neural network is also less robust to noise. Here, we aim to work with a "small brain" neural network rather than a deep neural network architecture. This approach has been specifically tuned with the aim of low-SWaP computational cameras. We conclude that:

Single-layer neural networks are capable of approximating the inverse mapping from phaseless Fourier-plane intensity patterns after basic training.

Such moderate-accuracy generalizable image reconstruction achieves high speeds (we achieve 15 k fps on a 15 W laptop CPU).

Image reconstruction with simpler neural networks are robust to vulnerabilities and instabilities.

Even with a simple neural network architecture and a large training basis set, we encounter differences in convergence. (Experimentally with an imperfect encoder, neural networks learn low SVD-entropy images more rapidly and reliably than high SVD-entropy.)

Low SVD-entropy images are valuable in training neural networks to extract the salient features of the image.

Additional advantages of a UTS include what is likely a generalized upper bound for error, higher robustness, and high potential for low-SWaP computational cameras. Because of its low computational complexity, our approach in the future may be inverted to uncover the inverse mapping in data-driven models to solve inverse problems. A higher degree of sampling over the sensor images (i.e., zero-padding) may further reduce the reconstruction image error and even provide additional advantages, i.e., super-resolution phase retrieval from multiple phase-coded diffraction patterns, and depth detection.

To better illustrate the devices and methods disclosed herein, a non-limiting list of embodiments is provided here:

Example 1 includes an imaging device. The imaging device includes a light source, a plurality of topological phase modulators, and a neural network coupled to an output of the plurality of topological phase modulators.

Example 2 includes the imaging device of example 1, wherein the plurality of topological phase modulators includes an array of topological phase modulators.

Example 3 includes the imaging device of any one of examples 1-2, wherein the plurality of topological phase modulators includes a plurality of spiral vortex phase modulators.

Example 4 includes the imaging device of any one of examples 1-3, wherein the light source includes a laser light source.

Example 5 includes the imaging device of any one of examples 1-4, wherein the neural network includes a shallow dense neural network.

Example 6 includes the imaging device of any one of examples 1-5, wherein the plurality of topological phase modulators include an array of nanobowls.

Example 7 includes the imaging device of any one of examples 1-6, wherein the array of nanobowls include nanofibers on a convex surface of nanobowls in the array of nanobowls.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such as a vertical in-hole resistor thermal sensor, a lateral PN diode thermal sensor, a vertical in-hole resistor thermal sensor or a lateral resistor thermal sensor, all underneath a transistor, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. An imaging device, comprising:
   a light source;
   a detector;
   a plurality of topological phase modulators including a plurality of nanobowls, the plurality of topological phase modulators located between the light source and the detector; and
   a neural network coupled to an output of the detector.

2. The imaging device of claim 1, wherein the plurality of topological phase modulators includes an array of topological phase modulators.

3. The imaging device of claim 1, wherein the plurality of topological phase modulators includes a plurality of spiral vortex phase modulators.

4. The imaging device of claim 1, wherein the light source includes a laser light source.

5. The imaging device of claim 1, wherein the neural network includes a shallow dense neural network.

6. The imaging device of claim 1, wherein the plurality of nanobowls include nanofibers on a convex surface of nanobowls in the plurality of nanobowls.

7. The imaging device of claim 1, wherein the detector includes a CCD device.

8. The imaging device of claim 1, wherein the plurality of topological phase modulators are configured to filter based on polarization.

9. The imaging device of claim 1, wherein the plurality of topological phase modulators are configured to filter based on color.

10. The imaging device of claim 1, wherein the plurality of nanobowls include a diameter between 200 nm and 700 nm.

11. The imaging device of claim 1, wherein the plurality of nanobowls include a fibrous structure that defines a shape of the nanobowls.

12. The imaging device of claim 11, wherein the fibrous structure includes polyaniline fibers.

13. The imaging device of claim 11, wherein the fibrous structure includes aligned fibers.

14. The imaging device of claim 1, wherein the neural network includes less than 10 layers.

15. The imaging device of claim 14, wherein the neural network includes 1-3 layers.

16. The imaging device of claim 1, wherein the neural network includes linear activation.

17. The imaging device of claim 1, wherein the neural network includes nonlinear activation.

* * * * *